United States Patent
Dutta et al.

(10) Patent No.: US 12,381,658 B2
(45) Date of Patent: Aug. 5, 2025

(54) TECHNIQUES FOR DIRECTIONAL SIDELINK TRANSMISSIONS WITH MULTI-TRANSMISSION-RECEPTION POINT (TRP) USER EQUIPMENTS (UES)

(71) Applicant: QUALCOMM Incorporated, San Diego, CA (US)

(72) Inventors: Sourjya Dutta, San Diego, CA (US); Kapil Gulati, Belle Mead, NJ (US); Junyi Li, Fairless Hills, PA (US); Shuanshuan Wu, San Diego, CA (US); Hui Guo, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 326 days.

(21) Appl. No.: 18/004,293

(22) PCT Filed: Sep. 4, 2020

(86) PCT No.: PCT/CN2020/113549
§ 371 (c)(1),
(2) Date: Jan. 4, 2023

(87) PCT Pub. No.: WO2022/047743
PCT Pub. Date: Mar. 10, 2022

(65) Prior Publication Data
US 2023/0254068 A1 Aug. 10, 2023

(51) Int. Cl.
*H04L 1/1812* (2023.01)
*H04W 72/1263* (2023.01)
*H04W 72/40* (2023.01)

(52) U.S. Cl.
CPC ....... *H04L 1/1812* (2013.01); *H04W 72/1263* (2013.01); *H04W 72/40* (2023.01)

(58) Field of Classification Search
CPC ... H04L 1/1812; H04L 1/1816; H04L 1/1819; H04W 72/40; H04W 72/02; H04W 72/04; H04W 72/12; H04W 72/1263
See application file for complete search history.

(56) References Cited

U.S. PATENT DOCUMENTS

2019/0044667 A1* 2/2019 Guo .................... H04L 1/1816
2020/0221432 A1 7/2020 Park et al.
(Continued)

FOREIGN PATENT DOCUMENTS

| CN | 110380828 A | 10/2019 |
|---|---|---|
| CN | 110708145 A | 1/2020 |

(Continued)

OTHER PUBLICATIONS

Huawei, et al., "Sidelink Control Channel Design of NR V2X", 3GPP Draft, 3GPP TSG RAN WG1 Meeting #94, R1-1808937, Gothenburg, Sweden, Aug. 20-24, 2018, 4 Pages.
(Continued)

*Primary Examiner* — Brian T Le
(74) *Attorney, Agent, or Firm* — Holland & Hart LLP

(57) ABSTRACT

Methods, systems, and devices for are described. A user equipment (UE) may transmit, via a first transmission-reception point (TRP), a first sidelink control information (SCI) scheduling a first sidelink transmission from the UE, the first SCI including an indication that a first hybrid automatic repeat request (HARQ) process associated with the first sidelink transmission is enabled. The UE may transmit, via a second TRP different from the first TRP, a second SCI scheduling a second sidelink transmission from the UE, the second SCI including an indication that a second HARQ process associated with the second sidelink transmission is disabled. The UE may transmit the first sidelink transmission and the second sidelink transmission via the first TRP and the second TRP, respectively, based on trans-
(Continued)

mitting the first and second SCI. The UE may monitor, via the first TRP, for a feedback message based on transmitting the first sidelink transmission.

34 Claims, 11 Drawing Sheets

(56) References Cited

U.S. PATENT DOCUMENTS

| | | | |
|---|---|---|---|
| 2020/0228246 | A1 | 7/2020 | Chendamarai Kannan et al. |
| 2021/0037534 | A1* | 2/2021 | Ji .......................... H04W 80/02 |
| 2022/0183002 | A1* | 6/2022 | Yeo ....................... H04L 1/1854 |

FOREIGN PATENT DOCUMENTS

| | | | |
|---|---|---|---|
| CN | 110896345 | A | 3/2020 |
| CN | 111132036 | A | 5/2020 |
| CN | 111600682 | A | 8/2020 |
| WO | WO-2019027304 | A1 | 2/2019 |
| WO | WO-2020144261 | A1 | 7/2020 |
| WO | WO-2020165410 | A1 | 8/2020 |

OTHER PUBLICATIONS

International Search Report and Written Opinion—PCT/CN2020/113549—ISA/EPO—Jun. 2, 2021 (207277WO1).
Supplementary European Search Report—EP20951987—Search Authority—The Hague—May 3, 2024 (207277EP).

* cited by examiner

TECHNIQUES FOR DIRECTIONAL SIDELINK TRANSMISSIONS WITH MULTI-TRANSMISSION-RECEPTION POINT (TRP) USER EQUIPMENTS (UES)

CROSS REFERENCE

The present Application is a 371 national stage filing of International PCT Application No. PCT/CN2020/113549 by Dutta et al. entitled "TECHNIQUES FOR DIRECTIONAL SIDELINK TRANSMISSIONS WITH MULTI-TRANSMISSION-RECEPTION POINT (TRP) USER EQUIPMENTS (UES)," filed Sep. 4, 2020, which is assigned to the assignee hereof, and which is expressly incorporated by reference in its entirety herein.

FIELD OF TECHNOLOGY

The following relates to, including techniques for directional sidelink transmissions with multi-transmission-reception point (TRP) user equipments (UEs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, wireless devices, such as user equipments (UEs), may include multiple transmission-reception points (TRPs). In some cases, the respective TRPs may include different quantities of other wireless devices to which they are connected. Moreover, radio conditions and physical obstructions may cause one TRP to have a lower quality link quality than another TRP.

SUMMARY

The described techniques relate to improved methods, systems, devices, and apparatuses that support techniques for directional sidelink transmissions with multi-transmission-reception point (TRP) user equipments (UEs). Generally, the described techniques provide for directional sidelink transmission with multi-TRP UEs. In some aspects, a multi-TRP UE may be configured to perform sidelink transmissions with a hybrid automatic repeat request (HARQ) process enabled with a first TRP, and may be configured to perform sidelink transmissions with a HARQ process disabled at a second TRP (e.g., blind transmission). For example, the multi-TRP UE may transmit separate SCI messages from a first TRP and a second TRP, where the SCI messages schedule sidelink transmissions from the respective TRPs. A first SCI transmitted by the first TRP may indicate that a HARQ process is enabled, and a second SCI transmitted by the second TRP may indicate that a HARQ process is disabled. Indications of the HARQ process state (e.g., enabled/disabled) may be indicated via separate values of a bit field within the SCI. Upon scheduling the sidelink transmissions from each TRP, the multi-TRP UE may transmit a first quantity of HARQ-enabled sidelink transmissions from the first TRP, and a second quantity of HARQ-disabled (e.g., blind) sidelink transmissions from the second TRP. In some aspects, the multi-TRP UE may determine which TRP is to use HARQ-based transmissions based on comparing parameters associated with the respective TRPs (e.g., reliability metrics, latency metrics, range metrics, quantity of retransmissions). Similarly, the multi-TRP may determine the quantities of retransmissions performed by the respective TRPs based on quality of service (QoS) metrics, historical quantities of retransmissions, and the like. By performing HARQ-based and blind transmissions with the respective TRPs, the multi-TRP UE may be able to transmit sidelink transmissions with the respective TRPs with varying quantities of retransmissions and varying sets of parameters, thereby improving the efficiency and reliability of sidelink communications. Moreover, by enabling one TRP to perform fewer retransmissions, techniques described herein may reduce signaling overhead within a wireless communications system.

A method for wireless communication at a UE is described. The method may include transmitting, via a first TRP, a first SCI scheduling a first sidelink transmission from the UE, the first SCI including an indication that a first HARQ process associated with the first sidelink transmission is enabled, transmitting, via a second TRP different from the first TRP, a second SCI scheduling a second sidelink transmission from the UE, the second SCI including an indication that a second HARQ process associated with the second sidelink transmission is disabled, transmitting, via the first TRP, the first sidelink transmission based on transmitting the first SCI, transmitting, via the second TRP, the second sidelink transmission based on transmitting the second SCI, and monitoring, via the first TRP, for a feedback message based on transmitting the first sidelink transmission.

An apparatus for wireless communication at a UE is described. The apparatus may include a processor, memory in electronic communication with the processor, and instructions stored in the memory. The instructions may be executable by the processor to cause the apparatus to transmit, via a first TRP, a first SCI scheduling a first sidelink transmission from the UE, the first SCI including an indication that a first HARQ process associated with the first sidelink transmission is enabled, transmit, via a second TRP different from the first TRP, a second SCI scheduling a second sidelink transmission from the UE, the second SCI including an indication that a second HARQ process associated with the second sidelink transmission is disabled, transmit, via the first TRP, the first sidelink transmission based on transmitting the first SCI, transmit, via the second TRP, the second sidelink transmission based on transmitting the second SCI, and monitor, via the first TRP, for a feedback message based on transmitting the first sidelink transmission.

Another apparatus for wireless communication at a UE is described. The apparatus may include means for transmitting, via a first TRP, a first SCI scheduling a first sidelink transmission from the UE, the first SCI including an indication that a first HARQ process associated with the first sidelink transmission is enabled, means for transmitting, via a second TRP different from the first TRP, a second SCI scheduling a second sidelink transmission from the UE, the second SCI including an indication that a second HARQ process associated with the second sidelink transmission is disabled, means for transmitting, via the first TRP, the first sidelink transmission based on transmitting the first SCI, means for transmitting, via the second TRP, the second sidelink transmission based on transmitting the second SCI, and means for monitoring, via the first TRP, for a feedback message based on transmitting the first sidelink transmission.

A non-transitory computer-readable medium storing code for wireless communication at a UE is described. The code may include instructions executable by a processor to transmit, via a first TRP, a first SCI scheduling a first sidelink transmission from the UE, the first SCI including an indication that a first HARQ process associated with the first sidelink transmission is enabled, transmit, via a second TRP different from the first TRP, a second SCI scheduling a second sidelink transmission from the UE, the second SCI including an indication that a second HARQ process associated with the second sidelink transmission is disabled, transmit, via the first TRP, the first sidelink transmission based on transmitting the first SCI, transmit, via the second TRP, the second sidelink transmission based on transmitting the second SCI, and monitor, via the first TRP, for a feedback message based on transmitting the first sidelink transmission.

Some examples of the method, apparatuses, and non-transitory computer-readable medium described herein may further include operations, features, means, or instructions for transmitting, via the first SCI, a first value of a first bit field associated with the first HARQ process, where the indication that the first HARQ process may be enabled includes the first value and transmitting, via the second SCI, a second value of a second bit field associated with the second HARQ process, where the indication that the second HARQ process may be disabled includes the second value.

Some examples of the method, apparatuses, and non-transitory computer-readable medium described herein may further include operations, features, means, or instructions for determining a HARQ process identifier associated with sidelink transmissions performed by the UE and transmitting, via the first SCI, the second SCI, or both, an indication that the first sidelink transmission, the second sidelink transmission, or both, may be associated with the determined HARQ process identifier.

Some examples of the method, apparatuses, and non-transitory computer-readable medium described herein may further include operations, features, means, or instructions for determining a first quantity of retransmissions which may be to be performed by the first TRP and a second quantity of retransmissions which may be to be performed by the second TRP, the second quantity of retransmissions different from the first quantity of retransmissions, where transmitting the first SCI, the second SCI, or both, may be based on the first quantity of retransmissions, the second quantity of retransmissions, or both.

Some examples of the method, apparatuses, and non-transitory computer-readable medium described herein may further include operations, features, means, or instructions for retransmitting the first sidelink transmission, via the first TRP, based on the first quantity of retransmissions and retransmitting the second sidelink transmission, via the second TRP, based on the second quantity of retransmissions.

Some examples of the method, apparatuses, and non-transitory computer-readable medium described herein may further include operations, features, means, or instructions for determining that the first quantity of retransmissions may be greater than the second quantity of retransmissions, where transmitting the first SCI, the second SCI, or both, may be based on determining that the first quantity of retransmissions may be greater than the second quantity of retransmissions.

Some examples of the method, apparatuses, and non-transitory computer-readable medium described herein may further include operations, features, means, or instructions for determining a first quality of service metric associated with sidelink transmissions performed by the first TRP and a second quality of service metric associated with sidelink transmissions performed by the second TRP, where determining the first quantity of retransmissions, the second quantity of retransmissions, or both, may be based on the first quality of service metric, the second quality of service metric, or both.

Some examples of the method, apparatuses, and non-transitory computer-readable medium described herein may further include operations, features, means, or instructions for determining a first sidelink transmission history associated with the first TRP and a second sidelink transmission history associated with the second TRP, where determining the first quantity of retransmissions, the second quantity of retransmissions, or both, may be based on the first sidelink transmission history, the second sidelink transmission history, or both.

Some examples of the method, apparatuses, and non-transitory computer-readable medium described herein may further include operations, features, means, or instructions for determining a first set of parameters associated with sidelink transmissions performed by the first TRP and a second set of parameters associated with sidelink transmissions performed by the second TRP, where transmitting the first SCI, the second SCI, or both, may be based on the first set of parameters, the second set of parameters, or both.

Some examples of the method, apparatuses, and non-transitory computer-readable medium described herein may further include operations, features, means, or instructions for receiving, from a higher layer of the UE, an indication of the first set of parameters, the second set of parameters, or both, where determining the first set of parameters, the second set of parameters, or both, may be based on receiving the indication from the higher layer of the UE.

In some examples of the method, apparatuses, and non-transitory computer-readable medium described herein, the first set of parameters, the second set of parameters, or both, includes a reliability metric, a latency metric, a HARQ process state, a transmission bias metric, a range metric, or any combination thereof.

Some examples of the method, apparatuses, and non-transitory computer-readable medium described herein may further include operations, features, means, or instructions for determining a first reliability metric associated with sidelink transmissions performed by the first TRP and a second reliability metric associated with sidelink transmissions performed by the second TRP, where the first set of parameters includes the first reliability metric and the second set of parameters includes the second reliability metric and determining that the second reliability metric may be greater than the first reliability metric, where transmitting the first SCI, the second SCI, or both, may be based on determining the second reliability metric may be greater than the first reliability metric.

Some examples of the method, apparatuses, and non-transitory computer-readable medium described herein may further include operations, features, means, or instructions for determining a first latency metric associated with sidelink transmissions performed by the first TRP and a second latency metric associated with sidelink transmissions performed by the second TRP, where the first set of parameters includes the first latency metric and the second set of parameters includes the second latency metric and determining that the first latency metric may be greater than the second latency metric, where transmitting the first SCI, the second SCI, or both, may be based on determining the first latency metric may be greater than the second latency metric.

Some examples of the method, apparatuses, and non-transitory computer-readable medium described herein may further include operations, features, means, or instructions for determining a first range metric associated with sidelink transmissions performed by the first TRP and a second range metric associated with sidelink transmissions performed by the second TRP, where the first set of parameters includes the first range metric and the second set of parameters includes the second range metric and comparing the first range metric and the second range metric, where transmitting the first SCI, the second SCI, or both, may be based on a result of the comparison.

Some examples of the method, apparatuses, and non-transitory computer-readable medium described herein may further include operations, features, means, or instructions for receiving, via the first TRP, the feedback message from a second UE based on the monitoring via the first TRP.

Some examples of the method, apparatuses, and non-transitory computer-readable medium described herein may further include operations, features, means, or instructions for monitoring, via the second TRP, for a second feedback message based on transmitting the second sidelink transmission and receiving, via the second TRP, the second feedback message based on the monitoring via the second TRP.

DETAILED DESCRIPTION

Figure 1:
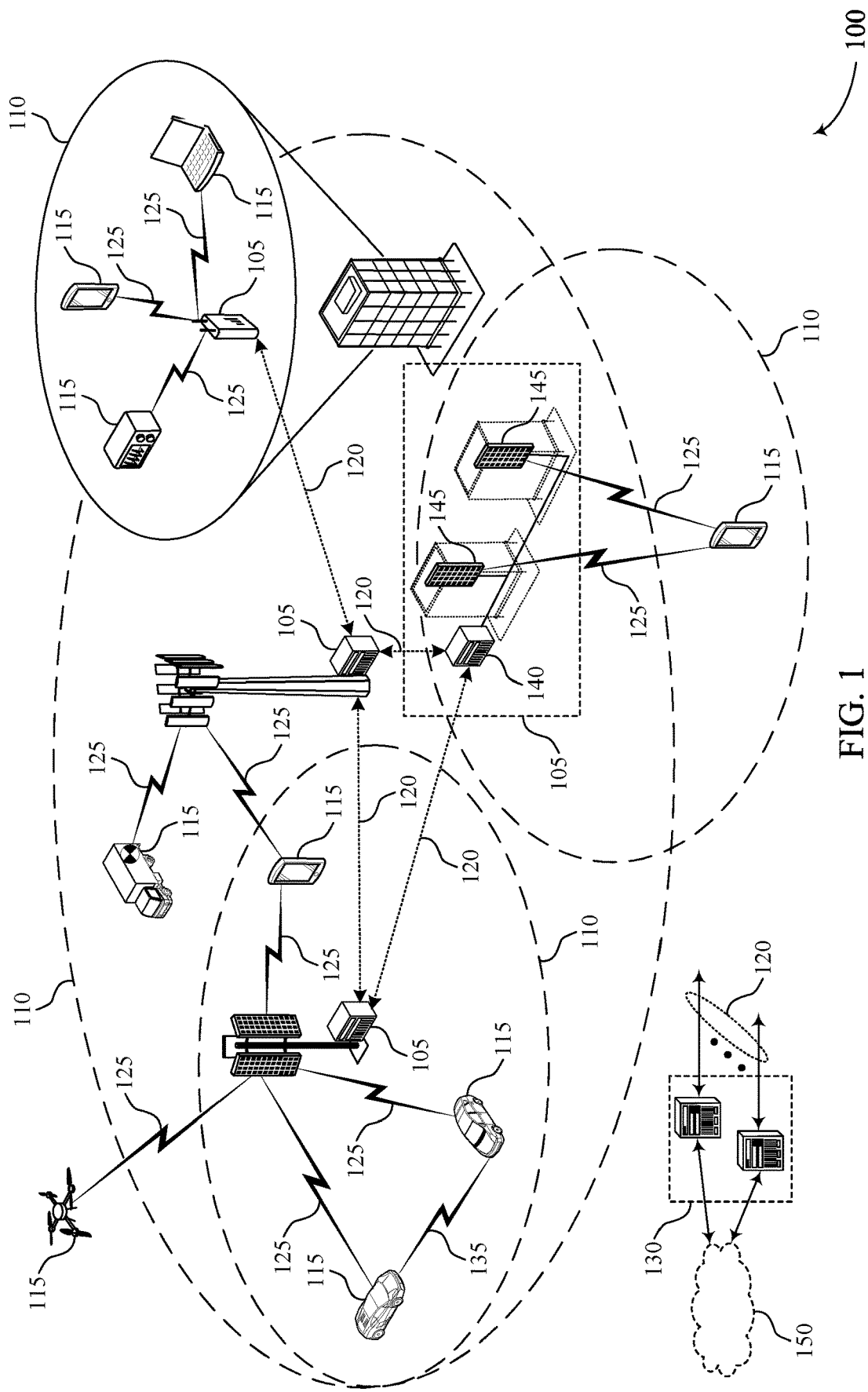
FIG. 1 illustrates an example of a wireless communications system that supports techniques for directional sidelink transmissions with multi-transmission-reception point (TRP) user equipments (UEs) in accordance with aspects of the present disclosure.

In some wireless communications systems, wireless devices, such as user equipments (UEs), may include multiple transmission-reception points (TRPs). For example, some vehicles may include TRPs at the front and rear of the vehicle such that the TRPs are separated by 2-20 meters depending on the length of the vehicle. In some cases, the respective TRPs may include different quantities of other wireless devices to which they are connected (e.g., more traffic in front of a vehicle may cause a front TRP to have a higher quantity of wireless connections than a rear TRP). Moreover, radio conditions and physical obstructions may cause one TRP to have a lower quality link quality than another TRP. In such cases, it may be beneficial to transmit sidelink transmissions from the respective TRPs with varying quantities of retransmissions. For instance, in cases where a first TRP has a poorer link quality than a second TRP, it may be desirable to perform a higher quantity of retransmissions with the first TRP to account for the differences in link quality. In some cases, transmission configuration indicator (TCI) states may indicate which TRP performs respective sidelink transmissions. However, sidelink control information (SCI) which schedules sidelink transmissions generally does not include TCI information. In the absence of TCI indicating the respective TRPs, current techniques do not enable multi-TRP UEs to perform varying quantities of retransmissions across multiple TRPs.

Accordingly, to improve sidelink transmissions, techniques for directional sidelink transmission with multi-TRP UEs are disclosed. In some aspects, a multi-TRP UE may be configured to perform sidelink transmissions with a hybrid automatic repeat request (HARQ) process enabled with a first TRP, and may be configured to perform sidelink transmissions with a HARQ process disabled at a second TRP (e.g., blind transmission). For example, the multi-TRP UE may transmit separate SCI messages from a first TRP and a second TRP, where the SCI messages schedule sidelink transmissions from the respective TRPs. A first SCI transmitted by the first TRP may indicate that a HARQ process is enabled, and a second SCI transmitted by the second TRP may indicate that a HARQ process is disabled. Indications of the HARQ process state (e.g., enabled/disabled) may be indicated via separate values of a bit field within the SCI. Upon scheduling the sidelink transmissions from each TRP, the multi-TRP UE may transmit a first quantity of HARQ-enabled sidelink transmissions from the first TRP, and a second quantity of HARQ-disabled (e.g., blind) sidelink transmissions from the second TRP. In some aspects, the multi-TRP UE may determine which TRP is to use HARQ-based transmissions based on comparing parameters associated with the respective TRPs (e.g., reliability metrics, latency metrics, range metrics, quantity of retransmissions). Similarly, the multi-TRP may determine the quantities of retransmissions performed by the respective TRPs based on quality of service (QoS) metrics, historical quantities of retransmissions, and the like. By performing HARQ-based and blind transmissions with the respective TRPs, the multi-TRP UE may be able to transmit sidelink transmissions with the respective TRPs with varying quantities of retransmissions and varying sets of parameters, thereby improving the efficiency and reliability of sidelink communications. Moreover, by enabling one TRP to perform fewer retransmissions, techniques described herein may reduce signaling overhead within a wireless communications system.

Aspects of the disclosure are initially described in the context of wireless communications systems. Additional aspects of the disclosure are described in the context of an example process flow. Aspects of the disclosure are further illustrated by and described with reference to apparatus diagrams, system diagrams, and flowcharts that relate to techniques for directional sidelink transmissions with multi-TRP UEs.

FIG. 1 illustrates an example of a wireless communications system 100 that supports techniques for directional sidelink transmissions with multi-TRP UEs in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), highest signal-to-interference-plus-noise ratio (SINR) or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The UEs 115 of the wireless communications system 100 may support techniques for directional sidelink transmission with multi-TRP UEs. In particular, the UEs 115 of the wireless communications system may be configured to perform sidelink transmissions with a first TRP with HARQ processes enabled, and may perform sidelink transmissions with a second TRP with HARQ processes disabled (e.g., blind transmissions). By performing HARQ-based and blind transmissions with the respective TRPs, the multi-TRP UE may be able to transmit sidelink transmissions with the respective TRPs with varying quantities of retransmissions and varying sets of parameters, thereby improving the efficiency and reliability of sidelink communications.

For example, a multi-TRP UE 115 of the wireless communications system 100 may transmit separate SCI messages from a first TRP and a second TRP, where the SCI messages schedule sidelink transmissions from the respective TRPs. A first SCI transmitted by the first TRP may indicate that a HARQ process is enabled, and a second SCI transmitted by the second TRP may indicate that a HARQ process is disabled. Indications of the HARQ process state (e.g., enabled/disabled) may be indicated via separate values of a bit field within the SCI. The separate SCI transmissions may schedule the sidelink transmissions to one or more UEs 115 of the wireless communications system 100.

Upon scheduling the sidelink transmissions from each TRP, the multi-TRP UE 115 may transmit a first quantity of HARQ-enabled sidelink transmissions from the first TRP, and a second quantity of HARQ-disabled (e.g., blind) sidelink transmissions from the second TRP. In some aspects, the multi-TRP UE 115 may determine which TRP is to use HARQ-based transmissions based on comparing parameters associated with the respective TRPs (e.g., reliability metrics, latency metrics, range metrics, quantity of retransmissions). Similarly, the multi-TRP may determine the quantities of retransmissions performed by the respective TRPs based on QoS metrics, historical quantities of retransmissions, and the like. By performing HARQ-based and blind transmissions with the respective TRPs, the multi-TRP UE 115 may be able to transmit sidelink transmissions with the respective TRPs with varying quantities of retransmissions and varying sets of parameters, thereby improving the efficiency and reliability of sidelink communications. Moreover, by enabling one TRP to perform fewer retransmissions, techniques described herein may reduce signaling overhead within a wireless communications system.

Techniques described herein may enable multi-TRP UEs 115 to perform both HARQ-based and blind transmissions with multiple TRPs. By performing HARQ-based and blind transmissions with the respective TRPs, the multi-TRP UE 115 may be able to transmit sidelink transmissions with the respective TRPs with varying quantities of retransmissions and varying sets of parameters, thereby improving the efficiency and reliability of sidelink communications. Moreover, by enabling one TRP to perform fewer retransmissions, techniques described herein may reduce signaling overhead within a wireless communications system 100, and may reduce power consumption at the multi-TRP UE 115, thereby improving battery performance and improving user experience.

Figure 2:
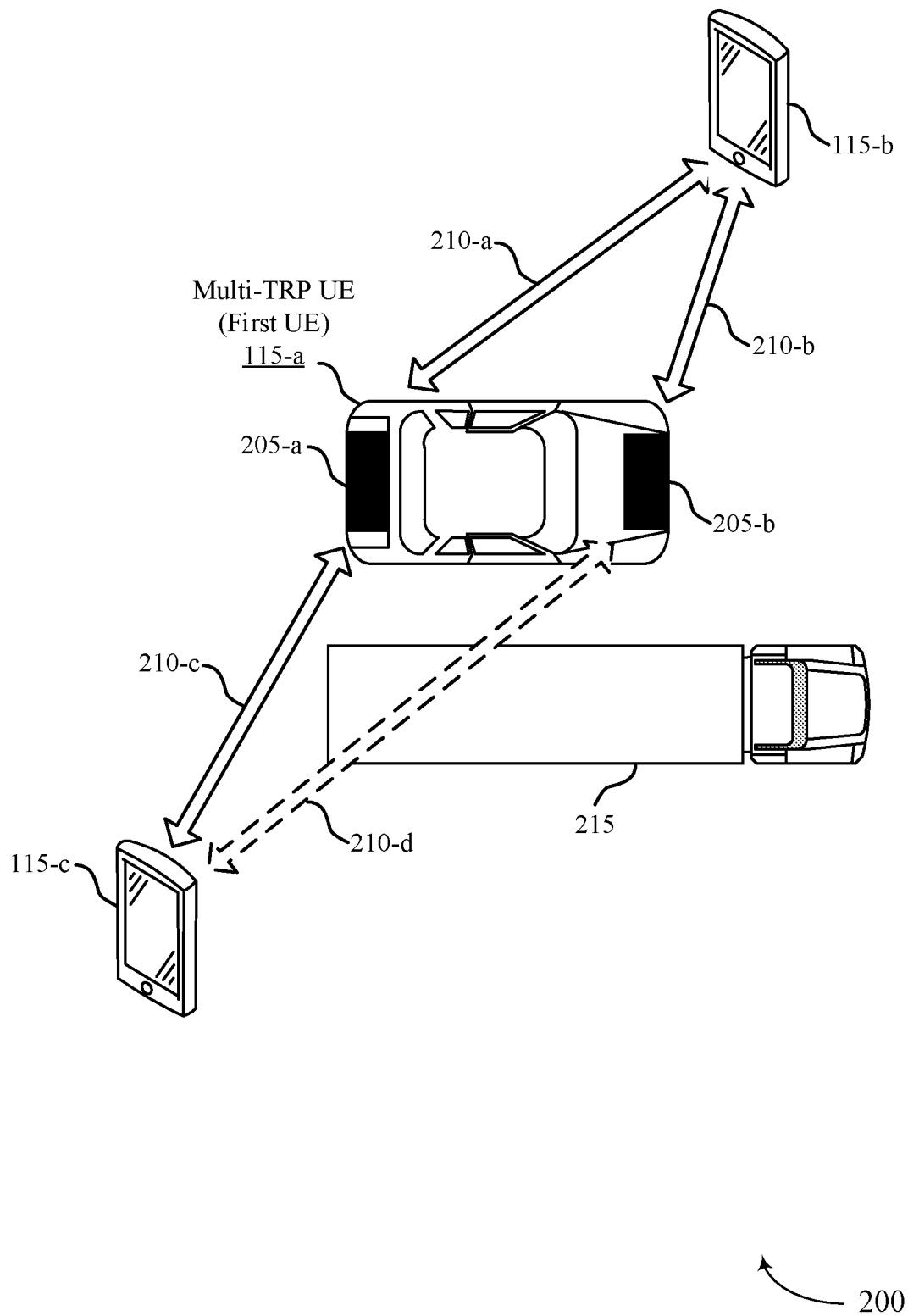
FIG. 2 illustrates an example of a wireless communications system that supports techniques for directional sidelink transmissions with multi-TRP UEs in accordance with aspects of the present disclosure.

FIG. 2 illustrates an example of a wireless communications system 200 that supports techniques for directional sidelink transmissions with multi-TRP UEs in accordance with aspects of the present disclosure. In some examples, wireless communications system 200 may implement aspects of wireless communications system 100. The wireless communications system 200 may include a first UE 115-a, a second UE 115-b, and a third UE 115-c, which may be examples of UEs 115 described with reference to FIG. 1.

In some aspects, the first UE 115-a illustrated in FIG. 2 may include a multi-TRP UE 115-a. For example, the first UE 115-a may include a first TRP 205-a and a second TRP 205-b. In some aspects, each of the TRPs 205-a and 205-b may be configured to receive and transmit signals. The TRPs 205-a and 205-b may be configured to transmit signals in conjunction with one another, individually (e.g., separately from one another), or both. In this regard, the TRPs 205 may include, but are not limited to, antennas, antenna panels, and the like.

In some cases, the TRPs 205 of the first UE 115-a may be positioned proximate (e.g., close) to one another. In other cases, the TRPs 205 of the first UE 115-a may be physically separated from each other by some distance. For example, in the context of a vehicle, the first TRP 205-a may be positioned near the front of the vehicle, and the second TRP 205-b may be positioned at near the rear of the vehicle. In this example, the first TRP 205-a (e.g., first antenna panel) and the second TRP 205-b (e.g., second antenna panel) may be separated from one another by several meters. This physical separation may be even larger in the case of larger UEs 115, such as semi-trucks, where multiple TRPs 205 may be physically separated from one another by twenty meters or more.

Due to the separate components, physical position, and physical separation between the first TRP 205-a and the second TRP 205-b, each of the respective TRPs 205 may view the channel differently. For example, the first TRP 205-a may receive signals from the second UE 115-b via a communications link 210-a, and the second TRP 205-b may receive signals from the second UE 115-b via communications link 210-b. In this example, the signals received at the first TRP 205-a may travel a greater distance than the signals received at the second TRP 205-b. The varying propagation distances may result in varying parameters (e.g., characteristics) associated with the signals received by the respective TRPs 205. For instance, due to the differences in propagation distances, the signals received at the first TRP 205-a may exhibit a lower signal quality (e.g., lower received signal strength indicator (RSSI), lower reference signal received power (RSRP), lower reference signal received quality (RSRQ), higher SNR, higher SINR) as compared to the signals received at the second TRP 205-b. Moreover, the signals received at the first TRP 205-a may be received later in time than the signals received at the second TRP 205-b. These differences in signal parameters (e.g., RSRP, RSRQ, SNR, SINR, time of receipt) may result despite the fact that the respective signals were transmitted by the second UE 115-b at the same time and with the same transmit power.

Physical obstructions, weather conditions, noise, line of sight (LoS) vs. non-line of sight (NLoS), and other conditions may further increase differences between signals transmitted and/or received by the respective TRPs 205. For example, the third UE 115-c may transmit signals to the first TRP 205-a via a communications link 210-c, and may transmit signals to the second TRP 205-b b via a communications link 210-d. In this example, the signals may be effectively received by the first TRP 205-a. However, the signals transmitted to the second TRP 205-b may be deflected, blocked, or otherwise interfered with by an obstruction 215, such as a truck. In this example, the signals may not be received from the third UE 115-c at the second TRP 205-b due to the obstruction 215. Additionally or alternatively, signals which are received at the second TRP 205-b may suffer from low signal quality as compared to the signals received by the first TRP 205-a.

These differences in channel qualities and/or signal qualities perceived by the respective TRPs 205 may result in issues experienced by the multi-TRP UE 115-a which are not experienced by other UEs 115 (e.g., single-TRP UEs 115). Additionally, due to the varying channel qualities and/or signal qualities, as well as the varying quantities of wireless connections associated with the respective TRPs, it may be beneficial to transmit sidelink transmissions from the respective TRPs with varying quantities of retransmissions. For instance, in cases where a first TRP has a poorer link quality than a second TRP, it may be desirable to perform a higher quantity of retransmissions with the first TRP to account for the differences in link quality.

However, SCI which schedules sidelink transmissions generally does not include TCI information which indicates which TRP performs respective sidelink transmissions. In the absence of TCI indicating the respective TRPs, current techniques do not enable multi-TRP UEs to perform varying quantities of retransmissions across multiple TRPs. Additionally, in some cases, a multi-TRP UE 115 may operate the different radio frequency (RF) modules of the respective TRPs with dedicated and/or shared hardware and software resources. For instance, in a first multi-TRP UE 115, a first TRP and a second TRP may exhibit separate RF modules and separate baseband components, but may share common processing in the physical layer, MAC layer, RLC layer, PDCP layer, RRC layer, or any combination thereof. By way of another example, in a second multi-TRP UE 115, a first TRP and a second TRP may exhibit separate RF modules, separate baseband components, and separate processing in the physical layer, MAC layer, RLC layer, PDCP layer, or any combination thereof, such that the first TRP and the second TRP only share common processing resources in the RRC layer. Generally speaking, different multi-TRP UEs 115 may exhibit varying degrees of shared and independent software and hardware resources. In cases where the separate TRPs utilize common processing in the physical layer, MAC layer, or both, each of the TRPs may be associated with a common HARQ process identifier, which further hinders the ability for the respective TRPs to perform sidelink transmissions separately from one another.

In this regard, techniques for directional sidelink transmission with multi-TRPs are disclosed. In particular, techniques described herein may enable sidelink transmissions to be performed independently via separate TRPs, where each TRP may be configured to perform the respective sidelink transmissions with varying quantities of retransmissions and different sets of parameters. Attendant advantages of the techniques described herein may be further shown and described with reference to FIG. 3.

Figure 3:
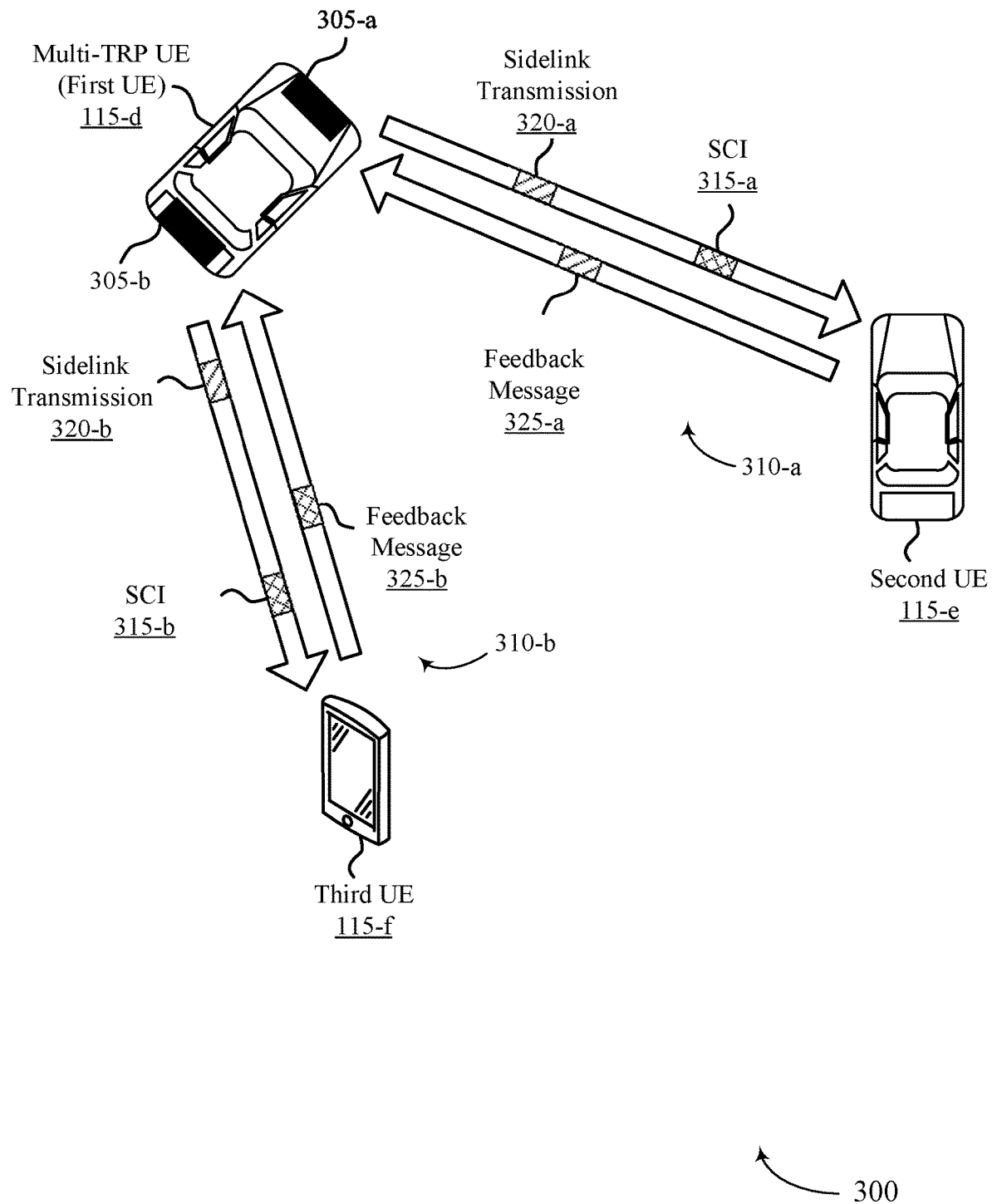
FIG. 3 illustrates an example of a wireless communications system that supports techniques for directional sidelink transmissions with multi-TRP UEs in accordance with aspects of the present disclosure.

FIG. 3 illustrates an example of a wireless communications system 300 that supports techniques for directional sidelink transmissions with multi-TRP UEs in accordance with aspects of the present disclosure. In some examples, wireless communications system 300 may implement aspects of wireless communications system 100 or 200. The wireless communications system 300 may include a first UE 115-*d*, a second UE 115-*e*, and a third UE 115-*f*, which may be examples of UEs 115 described with reference to FIG. 1.

In some aspects, the first UE 115-*d* may include a multi-TRP UE 115-*d*, as described previously herein with reference to FIGS. 1-2. In this regard, the first UE 115-*d* may include a first TRP 305-*a* and a second TRP 305-*b* different from the first TRP 305-*a*. The TRPs 305-*a* and 305-*b* may be configured to transmit signals in conjunction with one another, individually (e.g., separately from one another), or both. In this regard, the TRPs 305 may include, but are not limited to, antennas, antenna panels, and the like.

The UEs 115 of the wireless communications system 300 may communicate with one another via communications links. For example, the first UE 115-*d* may communicate with the second UE 115-*e* via a communications links 310-*a*, and may communicate with the third UE 115-*f* via a communications link 310-*b*. The communications links 310-*a* and 315-*b*, may be examples of sidelink communication links (e.g., PC5 links). In this regard, the communications links 310-*a*, and 310-*b* may include bi-directional links between the respective UEs 115-*d*, 115-*e*, and 115-*f*. In some aspects, each of the respective TRPs 305 may communicate with other wireless devices (e.g., second UE 115-*e*, third UE 115-*f*) within the wireless communications system 300 via separate communications links 310. For example, the first TRP 305-*a* of the first UE 115-*d* may transmit and/or receive signals from the second UE 115-*e* via the communications link 310-*a*. Similarly, the second TRP 305-*b* of the first UE 115-*d* may transmit and/or receive signals from the third UE 115-*f* via the communications link 310-*b*. In some aspects, the second UE 115-*e* and the third UE 115-*f* may additionally communicate with one another via one or more communications links (e.g., sidelink communication links, PC5 links).

The UEs 115 of the wireless communications system 100 may support techniques for directional sidelink transmission with multi-TRP UEs. In particular, the UEs 115 of the wireless communications system may be configured to perform sidelink transmissions with a first TRP with HARQ processes enabled, and may perform sidelink transmissions with a second TRP with HARQ processes disabled (e.g., blind transmissions). By performing HARQ-based and blind transmissions with the respective TRPs, the multi-TRP UE may be able to transmit sidelink transmissions with the respective TRPs with varying quantities of retransmissions and varying sets of parameters, thereby improving the efficiency and reliability of sidelink communications.

For example, the first UE 115-*d* may determine a HARQ process identifier (e.g., HARQ process ID) associated with sidelink transmissions performed by the first UE 115-*d*. In some aspects, the HARQ process identifier may be associated with sidelink transmissions 320 performed by the first TRP 305-*a* and the second TRP 305-*b* of the first UE 115-*d*. In particular, the first UE 115-*d* may determine various parameters or characteristics which may be used to determine which TRP 305 may be used to transmit sidelink transmissions 320 with a HARQ process enabled, which TRP 305 may be used to transmit sidelink transmissions 320 with a HARQ process disabled, quantities of retransmissions which are to be performed, or any combination thereof. The various parameters/characteristics which may be determined may include quantities of transmissions/retransmissions performed by each respective TRP 305, a QoS metric associated with each TRP 305, a sidelink transmission history associated with each TRP 305, reliability metrics associated with each TRP 305, latency metrics associated with each TRP 305, or any combination thereof.

For example, the first UE 115-*d* may determine sidelink transmission histories associated with each of the first TRP 305-*a* and the second TRP 305-*b*. For instance, the first UE 115-*d* may determine a first sidelink transmission history associated with the first TRP 305-*a*, and a second sidelink transmission history associated with the second TRP 305-*b*. In some aspects, the sidelink transmission histories may include historical quantities of retransmissions performed by the respective TRPs 305, various parameters associated with historical sidelink transmissions 320 performed by the respective TRPs 305 (e.g., RSRP, RSRQ, SNR, SINR), feedback history received in response to historical sidelink transmissions 320 performed by the respective TRPs 305, or any combination thereof. In this regard, the first UE 115-*d* may be configured to determine whether one TRP 305 has received higher quantities/percentages of negative acknowledgements (NACKs), which may indicate that the TRP 305 likely has to perform higher quantities of retransmissions to effectively convey data.

In some aspects, the first UE 115-*d* may determine QoS metrics associated with each of the TRPs 305 of the first UE 115-*d*. For example, the first UE 115-*d* may determine a first QoS metric associated with sidelink transmissions 320 to be performed by the first TRP 305-*a*, and a second QoS metric associated with sidelink transmissions 320 to performed by the second TRP 305-*b*. In some cases, the second QoS metric may be the same or different as the second QoS metric. For example, depending on the quantities and types of wireless connections and/or communications services (e.g., VoLTE calls, VoNR calls, gaming services) associated with each of the respective TRPs 305, sidelink transmissions 320 performed by one TRP 305 may require a higher quality than sidelink transmissions 320 performed by the other TRP 305. In some aspects, the first UE 115-*d* may determine the QoS metrics associated with each respective TRP 305 based on the sidelink transmission histories associated with each respective TRP 305.

In some aspects, the first UE 115-*d* may determine quantities of transmissions (e.g., retransmissions) which are to be performed by each of the first TRP 305-*a* and the second TRP 305-*b*. For example, the first UE 115-*d* may determine a first quantity of retransmissions which are to be performed by the first TRP 305-*a*, and a second quantity of retransmissions which are to be performed by the second TRP 305-*b*. In some cases, the second quantity of retransmissions may be the same or different as the first quantity of retransmissions. The first UE 115-*d* may determine the quantities of retransmissions which are to be performed by each TRP 305 based on the sidelink transmission histories associated with each respective TRP 305, the QoS metrics associated with each respective TRP 305, or both. For example, the first UE 115-*d* may determine that the first TRP 305-*a* has performed higher quantities of retransmissions than the second TRP 305-*b* based on the sidelink transmission histories associated with each of the TRPs 305. In this example, the first UE 115-*d* may determine that the first quantity of retransmissions associated with the first TRP 305-*a* is higher than the second quantity of retransmissions associated with the second TRP 305-*b* based on the respective sidelink transmission histories.

Additionally or alternatively, the first UE 115-*d* may determine sets of parameters associated with sidelink transmissions 320 which are to be performed by each of the first TRP 305-*a* and the second TRP 305-*b*. For example, the first UE 115-*d* may determine a first set of parameters associated with sidelink transmissions 320 which are to be performed by the first TRP 305-*a*, and a second set of parameters associated with sidelink transmissions 320 which are to be performed by the second TRP 305-*b*. In some cases, the first and second sets of parameters may be identical. In other cases, at least one parameter of the second set of parameters may be different from the first set of parameters, and vice versa. The sets of parameters associated with the sidelink transmissions 320 which are to be performed by the respective TRPs 305 may include, but are not limited to, reliability metrics, latency metrics, HARQ process states (e.g., HARQ enabled, HARQ disabled), transmission bias metrics, range metrics, or any combination thereof.

In some aspects, the set(s) of parameters may be determined based on signaling received from a higher layer of the first UE 115-*d*. For example, a component of the first UE 115-*d* (e.g., modem, processor) may receive, from a higher layer of the first UE 115-*d* (e.g., MAC layer, application layer) an indication of the first set of parameters, an indication of the second set of parameters, or both. For instance, the application layer of the first UE 115-*d* may indicate to a modem or processor of the first UE 115-*d* that sidelink transmissions 320 performed by the first TRP 305-*a* are to be performed with a HARQ process enabled, and that sidelink transmissions 320 performed by the second TRP 305-*b* are to be performed with a HARQ process disabled. Signaling received from the higher layer(s) of the first UE 115-*d* may indicate any parameters or characteristics including quantities of retransmissions to be performed, QoS metrics, reliability metrics, latency metrics, HARQ process states (e.g., HARQ enabled, HARQ disabled), transmission bias metrics, range metrics, or any combination thereof.

The first UE 115-*d* may transmit a first SCI 315-*a* using the first TRP 305-*a*. The first SCI 315-*a* may be transmitted to the second UE 115-*e*, the third UE 115-*f*, or both, and may schedule a first sidelink transmission 320-*a* from the first UE 115-*d* to the respective UEs 115-*e* and/or 115-*f*. For example, the first UE 115-*d* may transmit the first SCI 315-*a* to the second UE 115-*e*, where the first SCI 315-*a* schedules a first sidelink transmission 320-*a* over the communications link 310-*a*.

In some aspects, the first SCI 315-*a* may include an indication that a first HARQ process associated with the first sidelink transmission 320-*a* scheduled by the first SCI 315-*a* is enabled. In some aspects, the first SCI 315-*a* may include an indication of a first set of resources for transmitting/receiving the first sidelink transmission 320-*a*. The first set of resources may include a set of time resources, a set of frequency resources, a set of spatial resources, or any combination thereof. The first UE 115-*d* may transmit the first SCI 315-*a* based on determining the HARQ process identifier associated with sidelink transmissions performed by the first UE 115-*d*, determining the sidelink transmission histories associated with the respective TRPs 305, determining the QoS metrics associated with the respective TRPs 305, determining the quantities of retransmissions associated with the respective TRPs 305, determining the sets of parameters associated with the respective TRPs 305, or any combination thereof.

Similarly, the first UE 115-*d* may transmit a second SCI 315-*b* using the second TRP 305-*b*. The second SCI 315-*b* may be transmitted to the second UE 115-*e*, the third UE 115-*f*, or both, and may schedule a second sidelink transmission 320-*b* from the first UE 115-*d* to the respective UEs 115-*e* and/or 115-*f*. For example, the first UE 115-*d* may transmit the second SCI 315-*b* to the third UE 115-*f*, where the second SCI 315-*b* schedules a second sidelink transmission 320-*b* over the communications link 310-*b*.

In some aspects, the second SCI 315-*b* may include an indication that a second HARQ process associated with the second sidelink transmission 320-*b* scheduled by the second SCI 315-*b* is disabled (e.g., indication of blind transmissions). In some aspects, the second SCI 315-*b* may include an indication of a second set of resources for transmitting/receiving the second sidelink transmission 320-*b*. The second set of resources may include a set of time resources, a set of frequency resources, a set of spatial resources, or any combination thereof. The first UE 115-*d* may transmit the second SCI 315-*b* based on determining the HARQ process identifier associated with sidelink transmissions performed by the first UE 115-*d*, determining the sidelink transmission histories associated with the respective TRPs 305, determining the QoS metrics associated with the respective TRPs 305, determining the quantities of retransmissions associated with the respective TRPs 305, determining the sets of parameters associated with the respective TRPs 305, transmitting the first SCI 315-*a*, or any combination thereof.

In some aspects, the indications as to whether or not a HARQ process is enabled or disabled may be indicated via values of a bit field associated with the respective HARQ processes indicated in the SCIs 315. For example, the first SCI 315-*a* may include a first value of a bit field associated with the first HARQ process (e.g., HARQ feedback enabled bit=1). Similarly, the second SCI 315-*b* may include a second value of a bit field associated with the second HARQ process (e.g., HARQ feedback enabled bit=0). In these examples, the first value of the bit field within the first SCI 315-*a* (e.g., HARQ feedback enabled bit=1) may indicate that the first HARQ process associated with the first sidelink transmission 320-*a* is enabled, and the second value of the bit field within the second SCI 315-*b* (e.g., HARQ feedback enabled bit=0) may indicate that the first HARQ process associated with the second sidelink transmission 320-*b* is disabled. In some aspects, the bit field indicating the HARQ process state may include a "need feedback" bit field in SCI-2.

In some aspects, the first SCI 315-*a*, the second SCI 315-*b*, or both, may include an indication of the HARQ process identifier associated with sidelink transmissions performed by the first UE 115-*d*. In this regard, each SCI 315 may indicate that the sidelink transmissions 320 scheduled by the respective SCIs 315 are associated with the same HARQ process identifier. Additionally or alternatively, the first UE 115-*d* may transmit the first SCI 315-*a*, the second SCI 315-*b*, or both, based on the various parameters/characteristics associated with the respective TRPs (e.g., sidelink transmission histories, QoS metrics, quantities of retransmissions, reliability metrics, latency metrics, transmission bias metrics, range metrics, HARQ process states).

For example, the first UE 115-*d* may determine a first quantity of retransmissions which are to be performed by the first TRP 305-*a*, and a second quantity of retransmissions which are to be performed by the second TRP 305-*b*. In this example, the first UE 115-*d* may compare the first quantity of retransmissions and the second quantity of retransmissions, and may determine which TRP 305 is HARQ-enabled and which TRP 305 is HARQ-disabled based on the outcome of the comparison. Accordingly, the first UE 115-*d* may transmit the first SCI 315-*a*, the second SCI 315-*b*, or both, based on the outcome of the comparison. For instance, the first UE 115-*d* may determine that the first quantity of retransmissions associated with the first TRP 305-*a* is greater than the second quantity of retransmissions associated with the second TRP 305-*b*. In this example, the first UE 115-*d* may determine that the first TRP 305-*a* may perform sidelink transmissions 320 with the first HARQ process enabled, that the second TRP 305-*b* may perform sidelink transmissions 320 with the second HARQ process disabled, or both, based on the first quantity of retransmissions being greater than the second quantity of retransmissions.

By way of another example, the first UE 115-*d* may determine a first reliability metric of the first set of parameters associated with the first TRP 305-*a*, and a second reliability metric of the second set of parameters associated with the second TRP 305-*b*. In this example, the first UE 115-*d* may compare the first reliability metric and the second reliability metric, and may determine which TRP 305 is HARQ-enabled and which TRP 305 is HARQ-disabled based on the outcome of the comparison. Accordingly, the first UE 115-*d* may transmit the first SCI 315-*a*, the second SCI 315-*b*, or both, based on the outcome of the comparison. For instance, the first UE 115-*d* may determine that the second reliability metric associated with the second TRP 305-*b* is greater than the first reliability metric associated with the first TRP 305-*a*. In this example, the first UE 115-*d* may determine that the first TRP 305-*a* may perform sidelink transmissions 320 with the first HARQ process enabled, that the second TRP 305-*b* may perform sidelink transmissions 320 with the second HARQ process disabled, or both, based on the second reliability metric being greater than the first reliability metric.

By way of another example, the first UE 115-*d* may determine a first latency metric of the first set of parameters associated with the first TRP 305-*a*, and a second latency metric of the second set of parameters associated with the second TRP 305-*b*. In this example, the first UE 115-*d* may compare the first latency metric and the second latency metric, and may determine which TRP 305 is HARQ-enabled and which TRP 305 is HARQ-disabled based on the outcome of the comparison. Accordingly, the first UE 115-*d* may transmit the first SCI 315-*a*, the second SCI 315-*b*, or both, based on the outcome of the comparison. For instance, the first UE 115-*d* may determine that the first latency metric associated with the first TRP 305-*a* is greater than the second latency metric associated with the second TRP 305-*b*. In this example, the first UE 115-*d* may determine that the first TRP 305-*a* may perform sidelink transmissions 320 with the first HARQ process enabled, that the second TRP 305-*b* may perform sidelink transmissions 320 with the second HARQ process disabled, or both, based on the first latency metric being greater than the second latency metric.

By way of another example, the first UE 115-*d* may determine a first range metric of the first set of parameters associated with the first TRP 305-*a*, and a second range metric of the second set of parameters associated with the second TRP 305-*b*. Range metrics may indicate ranges from the first UE 115-*d* within which the respective sidelink transmissions 320 are intended to be received. In this example, the first UE 115-*d* may compare the first range metric and the second range metric, and may determine which TRP 305 is HARQ-enabled and which TRP 305 is HARQ-disabled based on the outcome of the comparison. Accordingly, the first UE 115-*d* may transmit the first SCI 315-*a*, the second SCI 315-*b*, or both, based on the outcome of the comparison of the respective range metrics.

In some aspects, the first UE 115-*d* may transmit the first sidelink transmission 320-*a* using the first TRP 305-*a*. In some aspects, the first UE 115-*d* may transmit the first sidelink transmission 320-*a* based on transmitting the first SCI 315-*a*. The first sidelink transmission 320-*a* may be transmitted to the second UE 115-*e*, the third UE 115-*f*, or both. For example, as shown in FIG. 3, the first UE 115-*d* may transmit the first sidelink transmission 320-*a* to the second UE 115-*e* via the communications link 310-*a*. In some aspects, the first sidelink transmission 320-*a* may be transmitted based on (e.g., using, according to) the first set of resources indicated in the first SCI 315-*a*. Additionally or alternatively, the first UE 115-*d* may transmit the first sidelink transmission 320-*a* based on determining the HARQ process identifier associated with the TRPs 305, determining the sidelink transmission histories associated with the respective TRPs 305, determining the QoS metrics associated with the respective TRPs 305, determining the quantities of retransmissions associated with the respective TRPs 305, determining the sets of parameters associated with the respective TRPs 305, or any combination thereof. In some aspects, the first sidelink transmission 320-*a* may include an indication of one or more parameters associated with the first TRP 305-*a* and/or the first sidelink transmission 320-*a*.

In some aspects, the first UE 115-*d* may retransmit the first sidelink transmission 320-*a* a given quantity of instances or iterations. For example, the first UE 115-*d* may determine a first quantity of retransmissions which are to be performed by the first TRP 305-*a*, and may retransmit the first sidelink transmission 320-*a* based on (e.g., according to) the first quantity of retransmissions.

Similarly, the first UE 115-*d* may transmit the second sidelink transmission 320-*b* using the second TRP 305-*b*. In some aspects, the first UE 115-*d* may transmit the second sidelink transmission 320-*b* based on transmitting the second SCI 315-*b*. The second sidelink transmission 320-*b* may be transmitted to the second UE 115-*e*, the third UE 115-*f*, or both. For example, as shown in FIG. 3, the first UE 115-*d* may transmit the second sidelink transmission 320-*b* to the third UE 115-*f* via the communications link 310-*b*. In some aspects, the second sidelink transmission 320-*b* may be transmitted based on (e.g., using, according to) the second set of resources indicated in the second SCI 315-*b*. Additionally or alternatively, the first UE 115-*d* may transmit the second sidelink transmission 320-*b* based on determining the HARQ process identifier associated with the TRPs 305, determining the sidelink transmission histories associated with the respective TRPs 305, determining the QoS metrics associated with the respective TRPs 305, determining the quantities of retransmissions associated with the respective TRPs 305, determining the sets of parameters associated with the respective TRPs 305, or any combination thereof. In some aspects, the second sidelink transmission 320-b may include an indication of one or more parameters associated with the second TRP 305-b and/or the second sidelink transmission 320-b.

In some aspects, the first UE 115-d may retransmit the second sidelink transmission 320-a a given quantity of instances or iterations. For example, the first UE 115-d may determine a second quantity of retransmissions which are to be performed by the second TRP 305-b, and may retransmit the second sidelink transmission 320-b based on (e.g., according to) the second quantity of retransmissions.

Upon transmitting the sidelink transmissions 320, the first UE 115-d may monitor for feedback messages 325. In some aspects, the first UE 115-d may monitor for feedback messages 325 using the first TRP 305-a based on transmitting the first SCI 315-a indicating that the first HARQ process is enabled, transmitting the first sidelink transmission 320-a, or both. In some cases, the first UE 115-d may additionally monitor for feedback messages 325 using the second TRP 305-b. In this regard, the first UE 115-d may monitor for feedback messages 325 using the second TRP 305-b despite the second HARQ process being disabled. Accordingly, the first UE 115-d may monitor for feedback messages 325 based on transmitting the second SCI 315-b indicating that the second HARQ process is disabled, transmitting the second sidelink transmission 320-b, or both.

The first UE 115-d may receive, via the first TRP 305-a, a first feedback message 325-a from the second UE 115-e based on monitoring for feedback messages 325 using the first TRP 305-a. Moreover, the second UE 115-e may transmit the first feedback message 325-a based on receiving the first sidelink transmissions 320-a. In some cases, the third UE 115-f may refrain from transmitting a feedback message based on the second HARQ process associated with the second sidelink transmission 320-b being disabled. However, in some cases, the third UE 115-f may transmit a second feedback message 325-b despite the second HARQ process being disabled. In such cases, the first UE 115-d may receive the second feedback message 325-b based on monitoring for feedback messages 325 using the second TRP 305-b.

Techniques described herein may enable the first UE 115-d (e.g., multi-TRP UE 115-d) to perform both HARQ-based and blind transmissions with multiple TRPs 305. By performing HARQ-based and blind transmissions with the respective TRPs 305, the multi-TRP UE 115-d may be able to transmit sidelink transmissions 320 with the respective TRPs 305 with varying quantities of retransmissions and varying sets of parameters, thereby improving the efficiency and reliability of sidelink communications. Moreover, by enabling one TRP 305 to perform fewer retransmissions, techniques described herein may reduce congestion and signaling overhead within the wireless communications system 300, and may reduce power consumption at the multi-TRP UE 115-d, thereby improving battery performance and improving user experience.

Figure 4:
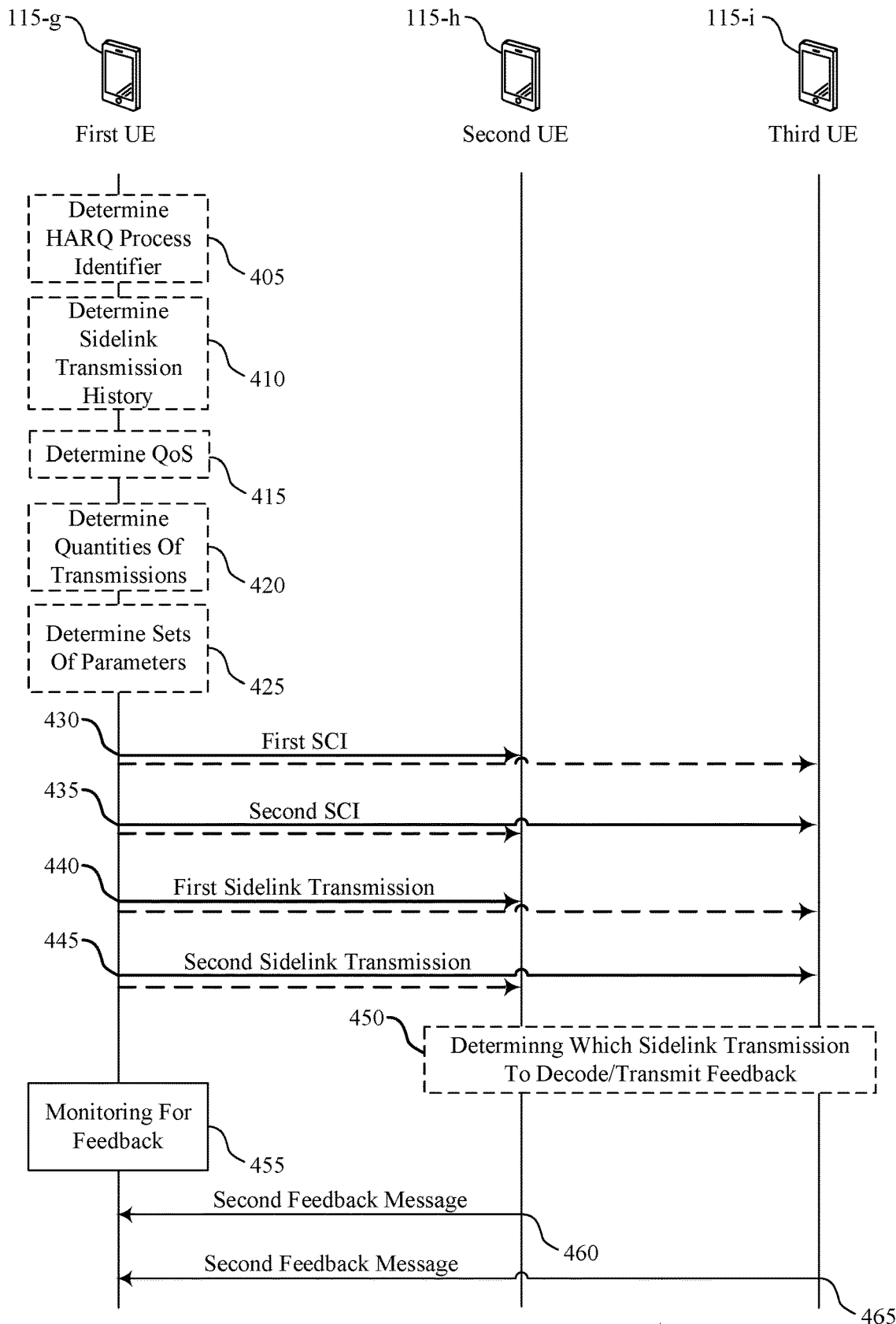
FIG. 4 illustrates an example of a process flow that supports techniques for directional sidelink transmissions with multi-TRP UEs in accordance with aspects of the present disclosure.

FIG. 4 illustrates an example of a process flow 400 that supports techniques for directional sidelink transmissions with multi-TRP UEs in accordance with aspects of the present disclosure. In some examples, process flow 400 may implement, or be implemented by, aspects of wireless communications system 100, 200, 300, or any combination thereof. For example, the process flow 400 may illustrate a first UE 115-g transmitting a first SCI and a second SCI, transmitting a first sidelink transmission with a first HARQ process enabled, and transmitting a second sidelink transmission with a second HARQ process disabled, as described with reference to FIGS. 1-3.

In some cases, process flow 400 may include a first UE 115-g, a second UE 115-h, and a third UE 115-i, which may be examples of corresponding devices as described herein. The first UE 115-g, the second UE 115-h, and the third UE 115-i illustrated in FIG. 4 may be examples of the first UE 115-d, the second UE 115-e, and the third UE 115-f, respectively, illustrated in FIG. 3. In this regard, the first UE 115-g may include a multi-TRP UE 115. In some aspects, the respective UEs 115 illustrated in FIG. 4 may communicate with one another via sidelink communications links, such as the communications links 310-a and 310-c illustrated in FIG. 3.

In some examples, the operations illustrated in process flow 400 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 405, the first UE 115-g may determine a HARQ process identifier (e.g., HARQ process ID) associated with sidelink transmissions performed by the first UE 115-g. In some aspects, the HARQ process identifier may be associated with sidelink transmissions performed by a first TRP and a second TRP of the first UE 115-g.

At 410 through 425, the first UE 115-g may determine various parameters or characteristics which may be used to determine which TRP may be used to transmit sidelink transmissions with a HARQ process enabled, which TRP may be used to transmit sidelink transmissions with a HARQ process disabled, quantities of retransmissions which are to be performed, or any combination thereof. The various parameters/characteristics which may be determined at 410 through 425 may include quantities of transmissions/retransmissions performed by each respective TRP, a QoS metric associated with each TRP, a sidelink transmission history associated with each TRP, reliability metrics associated with each TRP, latency metrics associated with each TRP, or any combination thereof. Each of these steps will be described in further detail herein.

At 410, the first UE 115-g may determine sidelink transmission histories associated with each of the first TRP and the second TRP of the first UE 115-g. For example, the first UE 115-g may determine a first sidelink transmission history associated with the first TRP, and a second sidelink transmission history associated with the second TRP. In some aspects, the sidelink transmission histories may include historical quantities of retransmissions performed by the respective TRPs, various parameters associated with historical sidelink transmissions performed by the respective TRPs (e.g., RSRP, RSRQ, SNR, SINR), feedback history received in response to historical sidelink transmissions performed by the respective TRPs, or any combination thereof. In this regard, the first UE 115-g may be configured to determine whether one TRP has received higher quantities/percentages of NACKs, which may indicate that the TRP likely has to perform higher quantities of retransmissions to effectively convey data.

At 415, the first UE 115-g may determine QoS metrics associated with each of the TRPs of the first UE 115-g. For example, the first UE 115-g may determine a first QoS metric associated with sidelink transmissions to be performed by the first TRP, and a second QoS metric associated with sidelink transmissions to be performed by the second TRP. In some cases, the second QoS metric may be the same or different as the second QoS metric. For example, depending on the quantities and types of wireless connections and/or communications services (e.g., VoLTE calls, VoNR calls, gaming services) associated with each of the respective TRPs, sidelink transmissions performed by one TRP may require a higher quality than sidelink transmissions performed by the other TRP. In some aspects, the first UE 115-*g* may determine the QoS metrics associated with each respective TRP based on the sidelink transmission histories associated with each respective TRP determined at 410.

At 420, the first UE 115-*g* may determine quantities of transmissions (e.g., retransmissions) which are to be performed by each of the first TRP and the second TRP of the first UE 115-*g*. For example, the first UE 115-*g* may determine a first quantity of retransmissions which are to be performed by the first TRP, and a second quantity of retransmissions which are to be performed by the second TRP. In some cases, the second quantity of retransmissions may be the same or different as the first quantity of retransmissions.

The first UE 115-*g* may determine the quantities of retransmissions which are to be performed by each TRP based on the sidelink transmission histories associated with each respective TRP determined at 410, the QoS metrics associated with each respective TRP determined at 415, or both. For example, the first UE 115-*g* may determine that the first TRP has performed higher quantities of retransmissions than the second TRP based on the sidelink transmission histories associated with each of the TRPs. In this example, the first UE 115-*g* may determine that the first quantity of retransmissions associated with the first TRP is higher than the second quantity of retransmissions associated with the second TRP based on the respective sidelink transmission histories.

At 425, the first UE 115-*g* may determine sets of parameters associated with sidelink transmissions which are to be performed by each of the first TRP and the second TRP of the first UE 115-*g*. For example, the first UE 115-*g* may determine a first set of parameters associated with sidelink transmissions which are to be performed by the first TRP, and a second set of parameters associated with sidelink transmissions which are to be performed by the second TRP. In some cases, the first and second sets of parameters may be identical. In other cases, at least one parameter of the second set of parameters may be different from the first set of parameters, and vice versa. The sets of parameters associated with the sidelink transmissions which are to be performed by the respective TRPs may include, but are not limited to, reliability metrics, latency metrics, HARQ process states (e.g., HARQ enabled, HARQ disabled), transmission bias metrics, range metrics, or any combination thereof.

In some aspects, the set(s) of parameters may be determined based on signaling received from a higher layer of the first UE 115-*g*. For example, a component of the first UE 115-*g* (e.g., modem, processor) may receive, from a higher layer of the first UE 115-*g* (e.g., MAC layer, application layer) an indication of the first set of parameters, an indication of the second set of parameters, or both. For instance, the application layer of the first UE 115-*g* may indicate to a modem or processor of the first UE 115-*g* that sidelink transmissions performed by the first TRP are to be performed with a HARQ process enabled, and that sidelink transmissions performed by the second TRP are to be performed with a HARQ process disabled. Signaling received from the higher layer(s) of the first UE 115-*g* may indicate any parameters or characteristics including quantities of retransmissions to be performed, QoS metrics, reliability metrics, latency metrics, HARQ process states (e.g., HARQ enabled, HARQ disabled), transmission bias metrics, range metrics, or any combination thereof.

At 430, the first UE 115-*g* may transmit a first SCI using the first TRP. The first SCI may be transmitted to the second UE 115-*h*, the third UE 115-*i*, or both, and may schedule a first sidelink transmission from the first UE 115-*g* to the respective UEs 115-*g* and/or 115-*i*. In some aspects, the first SCI may include an indication that a first HARQ process associated with the first sidelink transmission scheduled by the first SCI is enabled. In some aspects, the first SCI may include an indication of a first set of resources for transmitting/receiving the first sidelink transmission. The first set of resources may include a set of time resources, a set of frequency resources, a set of spatial resources, or any combination thereof. The first UE 115-*g* may transmit the first SCI at 430 based on determining the HARQ process identifier at 405, determining the sidelink transmission histories at 410, determining the QoS metrics at 415, determining the quantities of retransmissions at 420, determining the sets of parameters at 425, or any combination thereof.

At 435, the first UE 115-*g* may transmit a second SCI using the second TRP. The second SCI may be transmitted to the second UE 115-*h*, the third UE 115-*i*, or both, and may schedule a second sidelink transmission from the first UE 115-*g* to the respective UEs 115-*g* and/or 115-*i*. In some aspects, the second SCI may include an indication that a second HARQ process associated with the second sidelink transmission scheduled by the second SCI is disabled (e.g., indication of blind transmissions). In some aspects, the second SCI may include an indication of a second set of resources for transmitting/receiving the second sidelink transmission. The second set of resources may include a set of time resources, a set of frequency resources, a set of spatial resources, or any combination thereof. The first UE 115-*g* may transmit the second SCI at 435 based on determining the HARQ process identifier at 405, determining the sidelink transmission histories at 410, determining the QoS metrics at 415, determining the quantities of retransmissions at 420, determining the sets of parameters at 425, transmitting the first SCI at 430, or any combination thereof.

In some aspects, the indications as to whether or not a HARQ process is enabled or disabled may be indicated via values of a bit field associated with the respective HARQ processes indicated in the SCIs. For example, the first SCI may include a first value of a bit field associated with the first HARQ process (e.g., HARQ feedback enabled bit=1). Similarly, the second SCI may include a second value of a bit field associated with the second HARQ process (e.g., HARQ feedback enabled bit=0). In these examples, the first value of the bit field within the first SCI (e.g., HARQ feedback enabled bit=1) may indicate that the first HARQ process associated with the first sidelink transmission is enabled, and the second value of the bit field within the second SCI (e.g., HARQ feedback enabled bit=0) may indicate that the first HARQ process associated with the second sidelink transmission is disabled. In some aspects, the bit field indicating the HARQ process state may include a "need feedback" bit field in SCI-2.

In some aspects, the first SCI transmitted at 430, the second SCI transmitted at 435, or both, may include an indication of the HARQ process identifier determined at

405. In this regard, each SCI may indicate that the sidelink transmissions scheduled by the respective SCIs are associated with the same HARQ process identifier. Additionally or alternatively, the first UE 115-*g* may transmit the first SCI, the second SCI, or both, based on the various parameters/characteristics determined at 410 through 425 of the process flow 400.

For example, at 420, the first UE 115-*g* may determine a first quantity of retransmissions which are to be performed by the first TRP, and a second quantity of retransmissions which are to be performed by the second TRP. In this example, the first UE 115-*g* may compare the first quantity of retransmissions and the second quantity of retransmissions, and may determine which TRP is HARQ-enabled and which TRP is HARQ-disabled based on the outcome of the comparison. Accordingly, the first UE 115-*g* may transmit the first SCI, the second SCI, or both, based on the outcome of the comparison. For instance, the first UE 115-*g* may determine that the first quantity of retransmissions associated with the first TRP is greater than the second quantity of retransmissions associated with the second TRP. In this example, the first UE 115-*g* may determine that the first TRP may perform sidelink transmissions with the first HARQ process enabled, that the second TRP may perform sidelink transmissions with the second HARQ process disabled, or both, based on the first quantity of retransmissions being greater than the second quantity of retransmissions.

At 440, the first UE 115-*g* may transmit the first sidelink transmission using the first TRP. In some aspects, the first UE 115-*g* may transmit the first sidelink transmission based on transmitting the first SCI at 430. The first sidelink transmission may be transmitted to the second UE 115-*h*, the third UE 115-*i*, or both. In some aspects, the first sidelink transmission may be transmitted based on (e.g., using, according to) the first set of resources indicated in the first SCI. Additionally or alternatively, the first UE 115-*g* may transmit the first sidelink transmission at 440 based on determining the HARQ process identifier at 405, determining the sidelink transmission histories at 410, determining the QoS metrics at 415, determining the quantities of retransmissions at 420, determining the sets of parameters at 425, or any combination thereof.

In some aspects, the first UE 115-*g* may retransmit the first sidelink transmission a given quantity of instances or iterations. For example, at 420, the first UE 115-*g* may determine a first quantity of retransmissions which are to be performed by the first TRP, and may retransmit the first sidelink transmission at 440 based on (e.g., according to) the first quantity of retransmissions.

At 445, the first UE 115-*g* may transmit the second sidelink transmission using the second TRP. In some aspects, the first UE 115-*g* may transmit the second sidelink transmission based on transmitting the second SCI at 435. The second sidelink transmission may be transmitted to the second UE 115-*h*, the third UE 115-*i*, or both. In some aspects, the second sidelink transmission may be transmitted based on (e.g., using, according to) the second set of resources indicated in the second SCI. Additionally or alternatively, the first UE 115-*g* may transmit the second sidelink transmission at 445 based on determining the HARQ process identifier at 405, determining the sidelink transmission histories at 410, determining the QoS metrics at 415, determining the quantities of retransmissions at 420, determining the sets of parameters at 425, or any combination thereof.

In some aspects, the first UE 115-*g* may retransmit the second sidelink transmission a given quantity of instances or iterations. For example, at 420, the first UE 115-*g* may determine a second quantity of retransmissions which are to be performed by the second TRP, and may retransmit the second sidelink transmission at 445 based on (e.g., according to) the second quantity of retransmissions.

At 450, the second UE 115-*h*, the third UE 115-*i*, or both, may determine whether the respective UE 115 should decode and/or transmit feedback for the first sidelink transmission, the second sidelink transmission, or both. In cases where the second UE 115-*h*, the third UE 115-*i*, or both, receives only one of the first sidelink transmission or the second sidelink transmission, the respective UE 115 may decode only the received sidelink transmission. Moreover, the UEs 115-*h* and/or 115-*i* may transmit feedback (or refrain from transmitting feedback) based on (e.g., in accordance with) the indications as to whether the received sidelink transmissions are transmitted with HARQ processes enabled or disabled.

In cases where the second UE 115-*h*, the third UE 115-*i*, or both, receives both the first sidelink transmission and the third sidelink transmission, the respective UE 115-*h* and/or 115-*i* may determine which sidelink transmission to decode based on the indications of HARQ-enabled/HARQ-disabled, parameters associated with the respective sidelink transmissions (e.g., RSRP values, RSRQ values, RSSI values, SNR values, SINR values), or any combination thereof. For example, in cases where the second UE 115-*h*, the third UE 115-*i*, or both, receives both the first sidelink transmission and the third sidelink transmission, the respective UE 115-*h* and/or 115-*i* may decode only the first sidelink transmission based on the first HARQ process being enabled. In this example, the UE 115-*h* and/or 115-*i* may transmit feedback to the first UE 115-*g* based on decoding the first sidelink transmission. By way of another example, in cases where the second UE 115-*h*, the third UE 115-*i*, or both, receives both the first sidelink transmission and the third sidelink transmission, the respective UE 115-*h* and/or 115-*i* may decode only the second sidelink transmission based on the second HARQ process being disabled. In this example, the UE 115-*h* and/or 115-*i* may refrain from transmitting feedback to the first UE 115-*g* based on decoding the second sidelink transmission.

By way of another example, the second UE 115-*h*, the third UE 115-*i*, or both, may decode the sidelink transmission with the highest signal quality or signal strength (e.g., decode sidelink transmission with highest RSRP, RSRQ, RSSI, or sidelink transmission with lowest SNR or SINR). In other cases, the second UE 115-*h*, the third UE 115-*i*, or both, may receive and combine both sidelink transmissions for additional gain when processing capacity is available at the respective UE 115. In some cases, the UEs 115-*h* and 115-*i* may determine which sidelink transmission to decode based on range metrics indicate within the respective sidelink transmissions. For example, the first sidelink transmission may include an indication of a first range metric associated with the first sidelink transmission, and the second sidelink transmission may include an indication of a second range metric associated with the second sidelink transmission. In this example, if the second UE 115-*h* determines that it is within the first range metric but outside of the second range metric, the second UE 115-*h* may decode only the first sidelink transmission.

In additional or alternative cases, the UEs 115-*h* and 115-*i* may decode both the first sidelink transmission and the second sidelink transmission. In such cases, the UEs 115-*h* and 115-*i* may transmit feedback messages (e.g., ACK, NACK) in accordance with the respective HARQ process states (e.g., transmit feedback for the first sidelink transmission, refrain from transmitting feedback for the second sidelink transmission). For example, in cases where the UE 115-*h* receives both the first and second sidelink transmissions simultaneously (or substantially simultaneously), the UE 115-*h* may transmit a single feedback message. Moreover, the first UE 115-*g* may determine whether or not to process feedback messages received from the UEs 115-*h* and/or UE 115-*i* based on which TRP the respective feedback message is received at. For example, the first UE 115-*g* may determine to process feedback messages received at the first TRP, and may refrain from processing feedback messages received at the second TRP.

At 455, the first UE 115-*g* may monitor for feedback messages. In some aspects, the first UE 115-*g* may monitor for feedback messages using the first TRP based on transmitting the first SCI indicating that the first HARQ process is enabled, transmitting the first sidelink transmission, or both. In some cases, the first UE 115-*g* may additionally monitor for feedback messages using the second TRP. In this regard, the first UE 115-*g* may monitor for feedback messages using the second TRP despite the second HARQ process being disabled. Accordingly, the first UE 115-*g* may monitor for feedback messages based on transmitting the second SCI indicating that the second HARQ process is disabled, transmitting the second sidelink transmission, or both.

At 460, the first UE 115-*g* may receive a first feedback message from the second UE 115-*h*. In some aspects, the first UE 115-*g* may receive the first feedback message via the first TRP based on monitoring for feedback messages using the first TRP at 455. Moreover, the second UE 115-*h* may transmit the first feedback message at 460 based on receiving the first and/or second sidelink transmissions at 440 and 445, determining which sidelink transmission to decode and/or determining whether to transmit feedback at 450, or any combination thereof.

At 465, the first UE 115-*g* may receive a second feedback message from the third UE 115-*i*. In some aspects, the first UE 115-*g* may receive the second feedback message via the second TRP based on monitoring for feedback messages using the second TRP at 455. Moreover, the third UE 115-*i* may transmit the second feedback message at 465 based on receiving the first and/or second sidelink transmissions at 440 and 445, determining which sidelink transmission to decode and/or determining whether to transmit feedback at 450, or any combination thereof.

Techniques described herein may enable the first UE 115-*g* (e.g., multi-TRP UE 115-*g*) to perform both HARQ-based and blind transmissions with multiple TRPs. By performing HARQ-based and blind transmissions with the respective TRPs, the multi-TRP UE 115-*g* may be able to transmit sidelink transmissions with the respective TRPs with varying quantities of retransmissions and varying sets of parameters, thereby improving the efficiency and reliability of sidelink communications. Moreover, by enabling one TRP to perform fewer retransmissions, techniques described herein may reduce signaling overhead within a wireless communications system (e.g., wireless communications system 100, 200, or 300), and may reduce power consumption at the multi-TRP UE 115-*g*, thereby improving battery performance and improving user experience.

Figure 5:
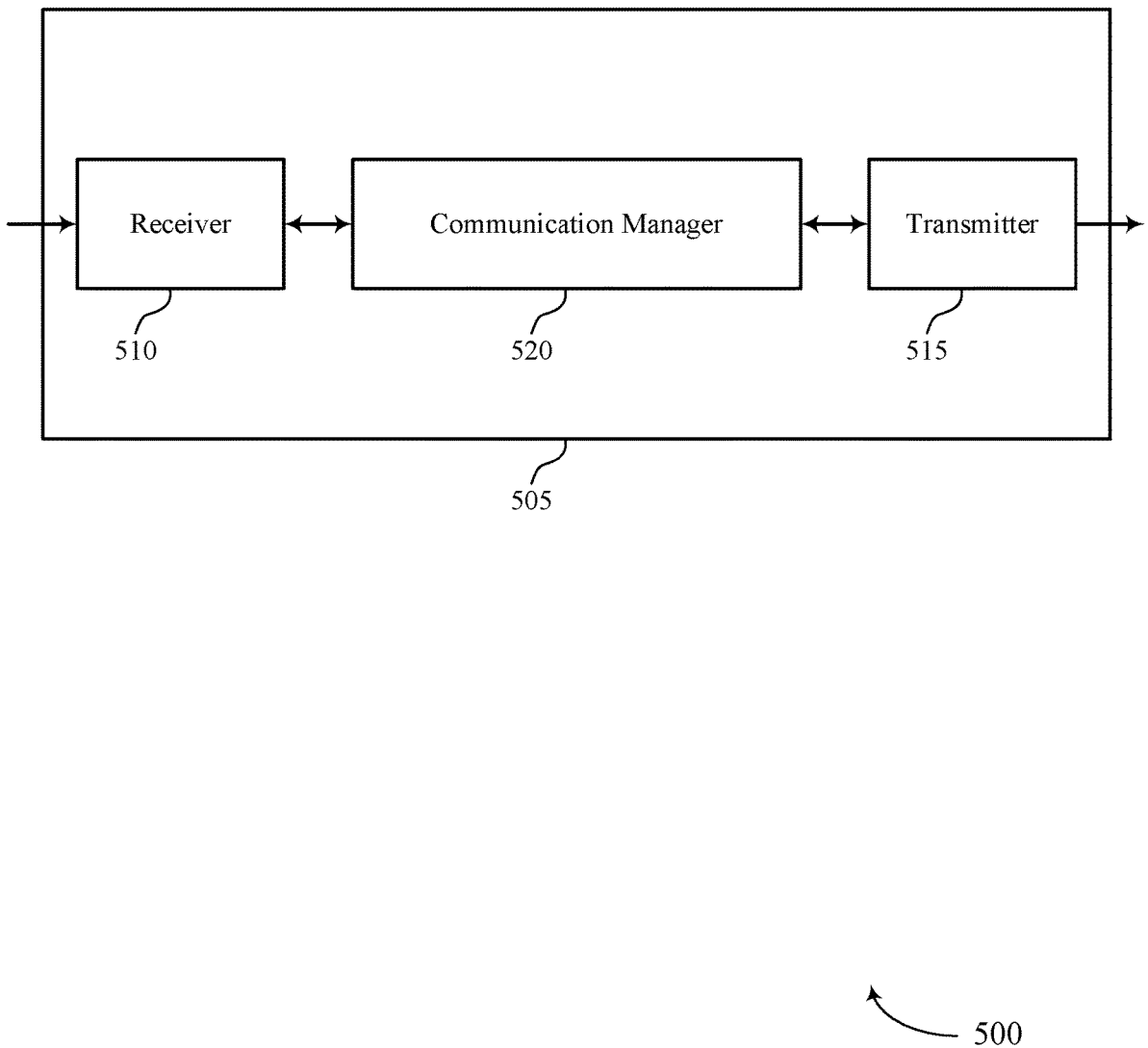
FIGS. 5 and 6 show block diagrams of devices that support techniques for directional sidelink transmissions with multi-TRP UEs in accordance with aspects of the present disclosure.

FIG. 5 shows a block diagram 500 of a device 505 that supports techniques for directional sidelink transmissions with multi-TRP UEs in accordance with aspects of the present disclosure. The device 505 may be an example of aspects of a UE 115 as described herein. The device 505 may include a receiver 510, a transmitter 515, and a communication manager 520. The device 505 may also include a processor. Each of these components may be in communication with one another (e.g., via one or more buses).

The receiver 510 may provide a means for receiving information such as packets, user data, or control information associated with various information channels (e.g., control channels, data channels, information related to techniques for directional sidelink transmissions with multi-TRP UEs). Information may be passed on to other components of the device 505. The receiver 510 may utilize a single antenna or a plurality of antennas.

The transmitter 515 may provide a means for transmitting signals generated by other components of the device 505. In some examples, the transmitter 515 may be co-located with a receiver 510 in a transceiver module. The transmitter 515 may utilize a single antenna or a plurality of antennas.

The communication manager 520, the receiver 510, the transmitter 515, or various combinations thereof or various components thereof, may be an example of a means for performing various aspects of techniques for directional sidelink transmissions with multi-TRP UEs as described herein.

In some examples, the communication manager 520 the receiver 510, the transmitter 515, or various combinations thereof or components thereof, may be implemented in hardware (e.g., in communications management circuitry). The circuitry may include a processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described in the present disclosure.

Additionally or alternatively, in some examples, the communication manager 520, the receiver 510, the transmitter 515, or various combinations thereof or components thereof, may be implemented in code (e.g., as communications management software or firmware) executed by a processor. If implemented in code executed by a processor, the functions of the communication manager 520, the receiver 510, the transmitter 515, or various combinations thereof or components thereof, may be executed by a general-purpose processor, a DSP, a CPU, an ASIC, an FPGA, or some other programmable logic device.

In some examples, the communication manager 520 may be configured to perform various operations (e.g., receiving, monitoring, transmitting) using or otherwise in cooperation with the receiver 510, the transmitter 515, or both.

The communication manager 520 may support wireless communication at a UE in accordance with examples as disclosed herein. For example, the communication manager 520 may be configured to provide or support a means for transmitting, via a first TRP, a first SCI scheduling a first sidelink transmission from the UE, the first SCI comprising an indication that a first hybrid automatic repeat request (HARQ) process associated with the first sidelink transmission is enabled. The communication manager 520 may be configured to provide or support a means for transmitting, via a second TRP different from the first TRP, a second SCI scheduling a second sidelink transmission from the UE, the second SCI comprising an indication that a second HARQ process associated with the second sidelink transmission is disabled. The communication manager 520 may be configured to provide or support a means for transmitting, via the first TRP, the first sidelink transmission based at least in part on transmitting the first SCI. The communication manager 520 may be configured to provide or support a means for transmitting, via the second TRP, the second sidelink transmission based at least in part on transmitting the second SCI. The communication manager 520 may be configured to provide or support a means for monitoring, via the first TRP, for a feedback message based at least in part on transmitting the first sidelink transmission.

By including or configuring the communication manager 520 in accordance with examples as described herein, the device 505 may support improved techniques for directional sidelink transmissions in the context of multi-TRP UEs 115. For example, by performing HARQ-based and blind transmissions with the respective TRPs, the multi-TRP UE 115-g may be able to transmit sidelink transmissions with the respective TRPs with varying quantities of retransmissions and varying sets of parameters, thereby improving the efficiency and reliability of sidelink communications. Moreover, by enabling one TRP to perform fewer retransmissions, techniques described herein may reduce signaling overhead within a wireless communications system (e.g., wireless communications system 100, 200, or 300), and may reduce power consumption at the multi-TRP UE 115-g, thereby improving battery performance and improving user experience.

Based on performing HARQ-based and blind transmissions with respective TRPs, a processor of the multi-TRP UE 115 (e.g., a processor controlling the receiver 510, the communication manager 520, the transmitter 515, etc.) may reduce processing resources used for wireless communications. For example, by enabling sidelink transmissions to be performed with differing quantities of sidelink transmissions, a quantity of sidelink transmissions and retransmissions may be reduced, thereby reducing network overhead. Moreover, by enabling differing quantities of sidelink transmissions and reducing quantities of sidelink transmissions which are to be performed, techniques described herein may reduce how often a processor of the multi-TRP UE 115 must ramp up to handle signal transmission and reception, thereby reducing processing resources, reducing power consumption, and improving battery performance.

Figure 6:
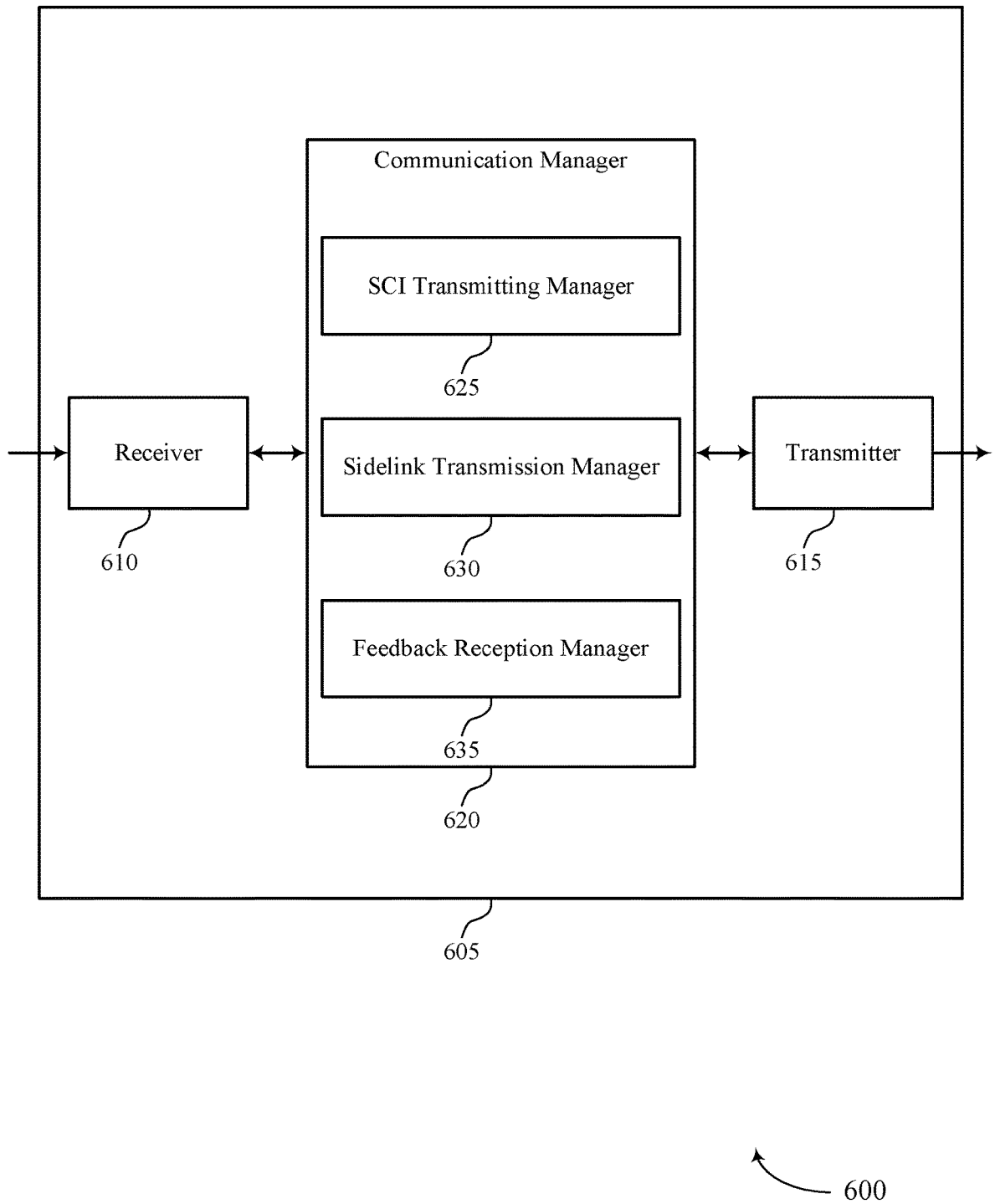

FIG. 6 shows a block diagram 600 of a device 605 that supports techniques for directional sidelink transmissions with multi-TRP UEs in accordance with aspects of the present disclosure. The device 605 may be an example of aspects of a device 505 or a UE 115 as described herein. The device 605 may include a receiver 610, a transmitter 615, and a communication manager 620. The device 605 may also include a processor. Each of these components may be in communication with one another (e.g., via one or more buses).

The receiver 610 may provide a means for receiving information such as packets, user data, or control information associated with various information channels (e.g., control channels, data channels, information related to techniques for directional sidelink transmissions with multi-TRP UEs). Information may be passed on to other components of the device 605. The receiver 610 may utilize a single antenna or a plurality of antennas.

The transmitter 615 may provide a means for transmitting signals generated by other components of the device 605. In some examples, the transmitter 615 may be co-located with a receiver 610 in a transceiver module. The transmitter 615 may utilize a single antenna or a plurality of antennas.

The device 605, or various components thereof, may be an example of means for performing various aspects of techniques for directional sidelink transmissions with multi-TRP UEs as described herein. For example, the communication manager 620 may include a SCI transmitting manager 625, a sidelink transmission manager 630, a feedback reception manager 635, or any combination thereof. The communication manager 620 may be an example of aspects of a communication manager 520 as described herein. In some examples, the communication manager 620, or various components thereof, may be configured to perform various operations (e.g., receiving, monitoring, transmitting) using or otherwise in cooperation with the receiver 610, the transmitter 615, or both.

The communication manager 620 may support wireless communication at a UE in accordance with examples as disclosed herein. The SCI transmitting manager 625 may be configured to provide or support a means for transmitting, via a first TRP, a first SCI scheduling a first sidelink transmission from the UE, the first SCI including an indication that a first HARQ process associated with the first sidelink transmission is enabled. The SCI transmitting manager 625 may be configured to provide or support a means for transmitting, via a second TRP different from the first TRP, a second SCI scheduling a second sidelink transmission from the UE, the second SCI including an indication that a second HARQ process associated with the second sidelink transmission is disabled. The sidelink transmission manager 630 may be configured to provide or support a means for transmitting, via the first TRP, the first sidelink transmission based on transmitting the first SCI. The sidelink transmission manager 630 may be configured to provide or support a means for transmitting, via the second TRP, the second sidelink transmission based on transmitting the second SCI. The feedback reception manager 635 may be configured to provide or support a means for monitoring, via the first TRP, for a feedback message based on transmitting the first sidelink transmission.

Figure 7:
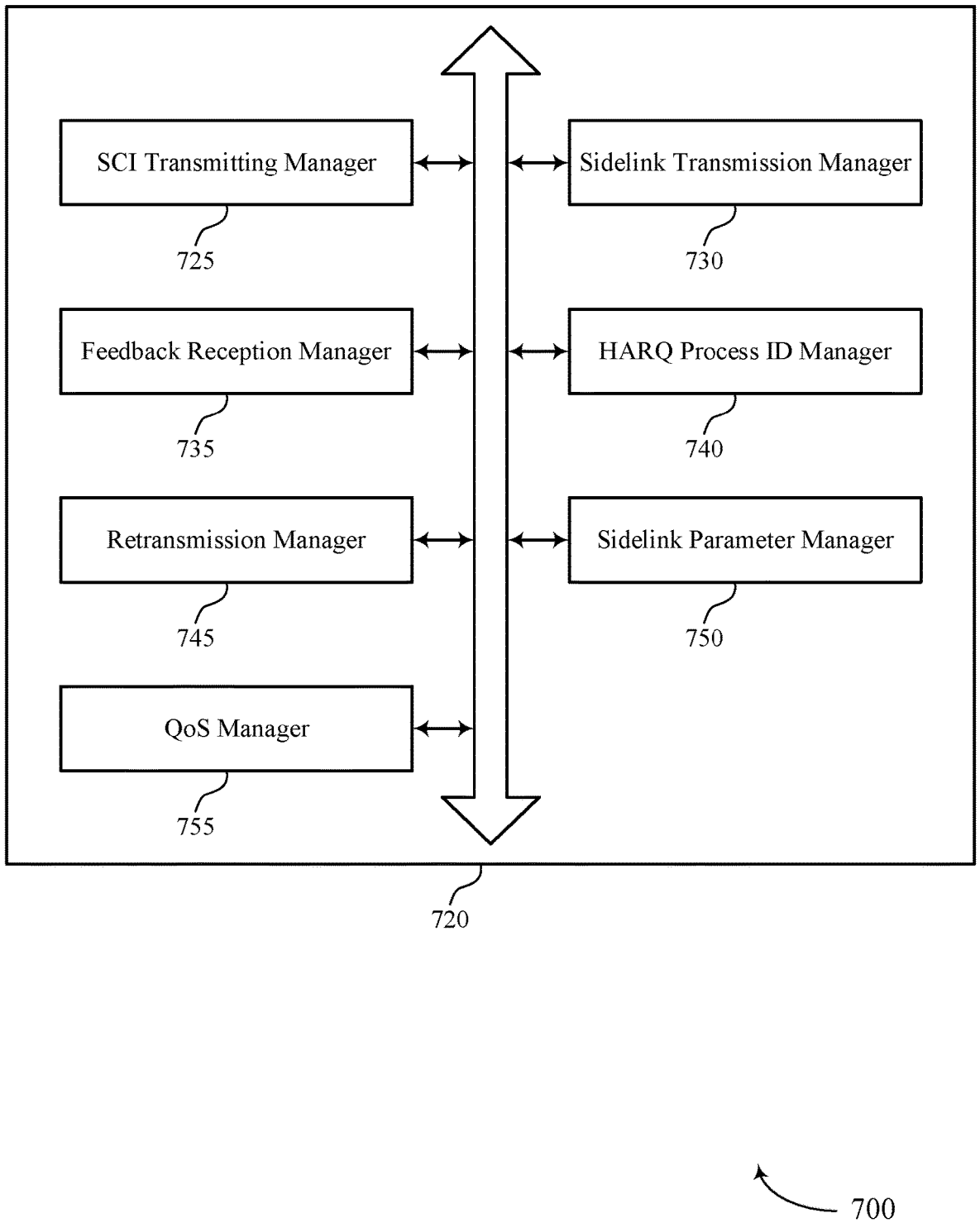
FIG. 7 shows a block diagram of a communication manager that supports techniques for directional sidelink transmissions with multi-TRP UEs in accordance with aspects of the present disclosure.

FIG. 7 shows a block diagram 700 of a communication manager 720 that supports techniques for directional sidelink transmissions with multi-TRP UEs in accordance with aspects of the present disclosure. The communication manager 720 may be an example of aspects of a communication manager 520, a communication manager 620, or both, as described herein. The communication manager 720, or various components thereof, may be an example of means for performing various aspects of techniques for directional sidelink transmissions with multi-TRP UEs as described herein. For example, the communication manager 720 may include a SCI transmitting manager 725, a sidelink transmission manager 730, a feedback reception manager 735, an HARQ process ID manager 740, a retransmission manager 745, a sidelink parameter manager 750, a QoS manager 755, or any combination thereof. Each of these components may communicate, directly or indirectly, with one another (e.g., via one or more buses).

The communication manager 720 may support wireless communication at a UE in accordance with examples as disclosed herein. The SCI transmitting manager 725 may be configured to provide or support a means for transmitting, via a first TRP, a first SCI scheduling a first sidelink transmission from the UE, the first SCI including an indication that a first HARQ process associated with the first sidelink transmission is enabled. In some examples, the SCI transmitting manager 725 may be configured to provide or support a means for transmitting, via a second TRP different from the first TRP, a second SCI scheduling a second sidelink transmission from the UE, the second SCI including an indication that a second HARQ process associated with the second sidelink transmission is disabled. The sidelink transmission manager 730 may be configured to provide or support a means for transmitting, via the first TRP, the first sidelink transmission based on transmitting the first SCI. In some examples, the sidelink transmission manager 730 may be configured to provide or support a means for transmitting, via the second TRP, the second sidelink transmission based on transmitting the second SCI. The feedback reception manager 735 may be configured to provide or support a means for monitoring, via the first TRP, for a feedback message based on transmitting the first sidelink transmission.

In some examples, the SCI transmitting manager 725 may be configured to provide or support a means for transmitting, via the first SCI, a first value of a first bit field associated with the first HARQ process, where the indication that the first HARQ process is enabled includes the first value. In some examples, the SCI transmitting manager 725 may be configured to provide or support a means for transmitting, via the second SCI, a second value of a second bit field associated with the second HARQ process, where the indication that the second HARQ process is disabled includes the second value.

In some examples, the HARQ process ID manager 740 may be configured to provide or support a means for determining a HARQ process identifier associated with sidelink transmissions performed by the UE. In some examples, the SCI transmitting manager 725 may be configured to provide or support a means for transmitting, via the first SCI, the second SCI, or both, an indication that the first sidelink transmission, the second sidelink transmission, or both, are associated with the determined HARQ process identifier.

In some examples, the retransmission manager 745 may be configured to provide or support a means for determining a first quantity of retransmissions which are to be performed by the first TRP and a second quantity of retransmissions which are to be performed by the second TRP, the second quantity of retransmissions different from the first quantity of retransmissions, where transmitting the first SCI, the second SCI, or both, is based on the first quantity of retransmissions, the second quantity of retransmissions, or both.

In some examples, the sidelink transmission manager 730 may be configured to provide or support a means for retransmitting the first sidelink transmission, via the first TRP, based on the first quantity of retransmissions. In some examples, the sidelink transmission manager 730 may be configured to provide or support a means for retransmitting the second sidelink transmission, via the second TRP, based on the second quantity of retransmissions.

In some examples, the retransmission manager 745 may be configured to provide or support a means for determining that the first quantity of retransmissions is greater than the second quantity of retransmissions, where transmitting the first SCI, the second SCI, or both, is based on determining that the first quantity of retransmissions is greater than the second quantity of retransmissions.

In some examples, the QoS manager 755 may be configured to provide or support a means for determining a first quality of service metric associated with sidelink transmissions performed by the first TRP and a second quality of service metric associated with sidelink transmissions performed by the second TRP, where determining the first quantity of retransmissions, the second quantity of retransmissions, or both, is based on the first quality of service metric, the second quality of service metric, or both.

In some examples, the sidelink transmission manager 730 may be configured to provide or support a means for determining a first sidelink transmission history associated with the first TRP and a second sidelink transmission history associated with the second TRP, where determining the first quantity of retransmissions, the second quantity of retransmissions, or both, is based on the first sidelink transmission history, the second sidelink transmission history, or both.

In some examples, the sidelink parameter manager 750 may be configured to provide or support a means for determining a first set of parameters associated with sidelink transmissions performed by the first TRP and a second set of parameters associated with sidelink transmissions performed by the second TRP, where transmitting the first SCI, the second SCI, or both, is based on the first set of parameters, the second set of parameters, or both.

In some examples, the sidelink parameter manager 750 may be configured to provide or support a means for receiving, from a higher layer of the UE, an indication of the first set of parameters, the second set of parameters, or both, where determining the first set of parameters, the second set of parameters, or both, is based on receiving the indication from the higher layer of the UE.

In some examples, the first set of parameters, the second set of parameters, or both, including a reliability metric, a latency metric, a HARQ process state, a transmission bias metric, a range metric, or any combination thereof.

In some examples, the sidelink parameter manager 750 may be configured to provide or support a means for determining a first reliability metric associated with sidelink transmissions performed by the first TRP and a second reliability metric associated with sidelink transmissions performed by the second TRP, where the first set of parameters includes the first reliability metric and the second set of parameters includes the second reliability metric. In some examples, the sidelink parameter manager 750 may be configured to provide or support a means for determining that the second reliability metric is greater than the first reliability metric, where transmitting the first SCI, the second SCI, or both, is based on determining the second reliability metric is greater than the first reliability metric.

In some examples, the sidelink parameter manager 750 may be configured to provide or support a means for determining a first latency metric associated with sidelink transmissions performed by the first TRP and a second latency metric associated with sidelink transmissions performed by the second TRP, where the first set of parameters includes the first latency metric and the second set of parameters includes the second latency metric. In some examples, the sidelink parameter manager 750 may be configured to provide or support a means for determining that the first latency metric is greater than the second latency metric, where transmitting the first SCI, the second SCI, or both, is based on determining the first latency metric is greater than the second latency metric.

In some examples, the sidelink parameter manager 750 may be configured to provide or support a means for determining a first range metric associated with sidelink transmissions performed by the first TRP and a second range metric associated with sidelink transmissions performed by the second TRP, where the first set of parameters includes the first range metric and the second set of parameters includes the second range metric. In some examples, the sidelink parameter manager 750 may be configured to provide or support a means for comparing the first range metric and the second range metric, where transmitting the first SCI, the second SCI, or both, is based on a result of the comparison.

In some examples, the feedback reception manager 735 may be configured to provide or support a means for receiving, via the first TRP, the feedback message from a second UE based on the monitoring via the first TRP.

In some examples, the feedback reception manager 735 may be configured to provide or support a means for monitoring, via the second TRP, for a second feedback message based on transmitting the second sidelink transmission. In some examples, the feedback reception manager 735 may be configured to provide or support a means for receiving, via the second TRP, the second feedback message based on the monitoring via the second TRP.

Figure 8:
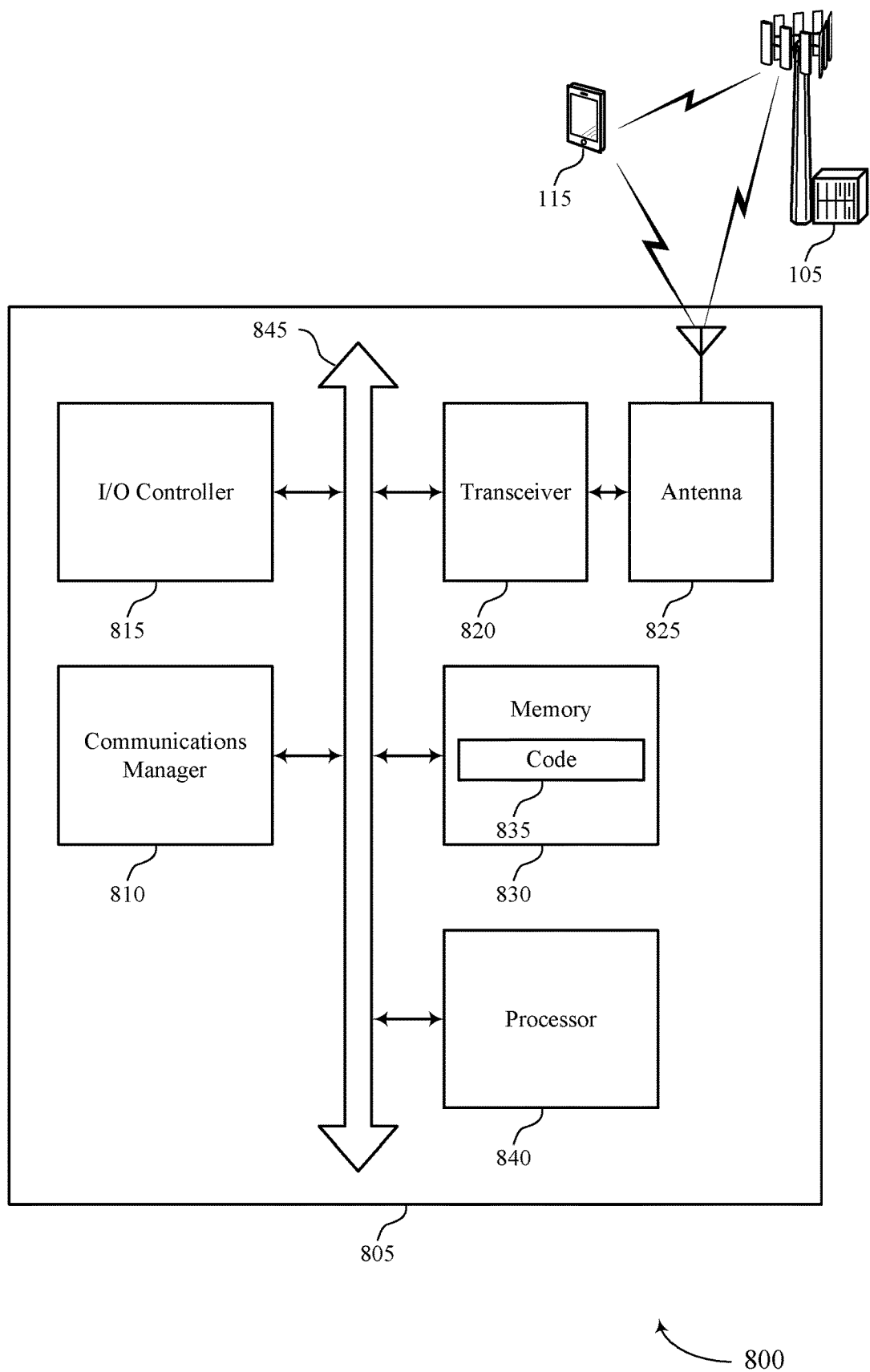
FIG. 8 shows a diagram of a system including a device that supports techniques for directional sidelink transmissions with multi-TRP UEs in accordance with aspects of the present disclosure.

FIG. 8 shows a diagram of a system 800 including a device 805 that supports techniques for directional sidelink transmissions with multi-TRP UEs in accordance with aspects of the present disclosure. The device 805 may be an example of or include the components of device, device 605, or a UE 115 as described herein. The device 805 may communicate wirelessly with one or more base stations 105, UEs 115, or any combination thereof. The device 805 may include components for bi-directional voice and data communications including components for transmitting and receiving communications, including a communication manager 810, a I/O controller 815, a transceiver 820, an antenna 825, a memory 830, a code 835, and a processor 840. These components may be in electronic communication or otherwise coupled (e.g., operatively, communicatively, functionally, electronically, electrically) via one or more buses (e.g., bus 845).

The I/O controller 815 may manage input and output signals for device 805. The I/O controller 815 may also manage peripherals not integrated into device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touch-screen, or a similar device. In some cases, the I/O controller 815 may be implemented as part of a processor. In some cases, a user may interact with device 805 via the I/O controller 815 or via hardware components controlled by the I/O controller 815.

In some cases, the device 805 may include a single antenna 825. However, in some cases the device may have more than one antenna 825, which may be capable of concurrently transmitting or receiving multiple wireless transmissions. The transceiver 820 may communicate bi-directionally, via the one or more antennas 825, wired, or wireless links as described herein. For example, the transceiver 820 may represent a wireless transceiver and may communicate bi-directionally with another wireless transceiver. The transceiver 820 may also include a modem to modulate the packets and provide the modulated packets to one or more antennas 825 for transmission, and to demodulate packets received from the one or more antennas 825. The transceiver 820, or the transceiver 820 and one or more antennas 825, may be an example of a transmitter 515, a transmitter 615, a receiver 510, a receiver 610, or any combination thereof or component thereof, as described herein.

The memory 830 may include random-access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or other type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for directional sidelink transmissions with multi-TRP UEs).

The communication manager 810 may support wireless communication at a UE in accordance with examples as disclosed herein. For example, the communication manager 810 may be configured to provide or support a means for transmitting, via a first TRP, a first SCI scheduling a first sidelink transmission from the UE, the first SCI including an indication that a first HARQ process associated with the first sidelink transmission is enabled. The communication manager 810 may be configured to provide or support a means for transmitting, via a second TRP different from the first TRP, a second SCI scheduling a second sidelink transmission from the UE, the second SCI including an indication that a second HARQ process associated with the second sidelink transmission is disabled. The communication manager 810 may be configured to provide or support a means for transmitting, via the first TRP, the first sidelink transmission based on transmitting the first SCI. The communication manager 810 may be configured to provide or support a means for transmitting, via the second TRP, the second sidelink transmission based on transmitting the second SCI. The communication manager 810 may be configured to provide or support a means for monitoring, via the first TRP, for a feedback message based on transmitting the first sidelink transmission.

By including or configuring the communication manager 810 in accordance with examples as described herein, the device 805 may support improved techniques for directional sidelink transmission in the context of multi-TRP UEs 115. For example, by enabling sidelink transmissions to be performed with differing quantities of sidelink transmissions, a quantity of sidelink transmissions and retransmissions may be reduced, thereby reducing network overhead. Moreover, by enabling differing quantities of sidelink transmissions and reducing quantities of sidelink transmissions which are to be performed, techniques described herein may reduce how often a processor of the multi-TRP UE 115 must ramp up to handle signal transmission and reception, thereby reducing processing resources, reducing power consumption, and improving battery performance.

In some examples, the communication manager 810 may be configured to perform various operations (e.g., receiving, monitoring, transmitting) using or otherwise in cooperation with the transceiver 820, the one or more antennas 825, or any combination thereof. Although the communication manager 810 is illustrated as a separate component, in some examples, one or more functions described with reference to the communication manager 810 may be supported by or performed by the processor 840, the memory 830, the code 835, or any combination thereof. For example, the code 835 may include instructions executable by the processor 840 to cause the device 805 to perform various aspects of techniques for directional sidelink transmissions with multi-TRP UEs as described herein, or the processor 840 and the memory 830 may be otherwise configured to perform or support such operations.

Figure 9:
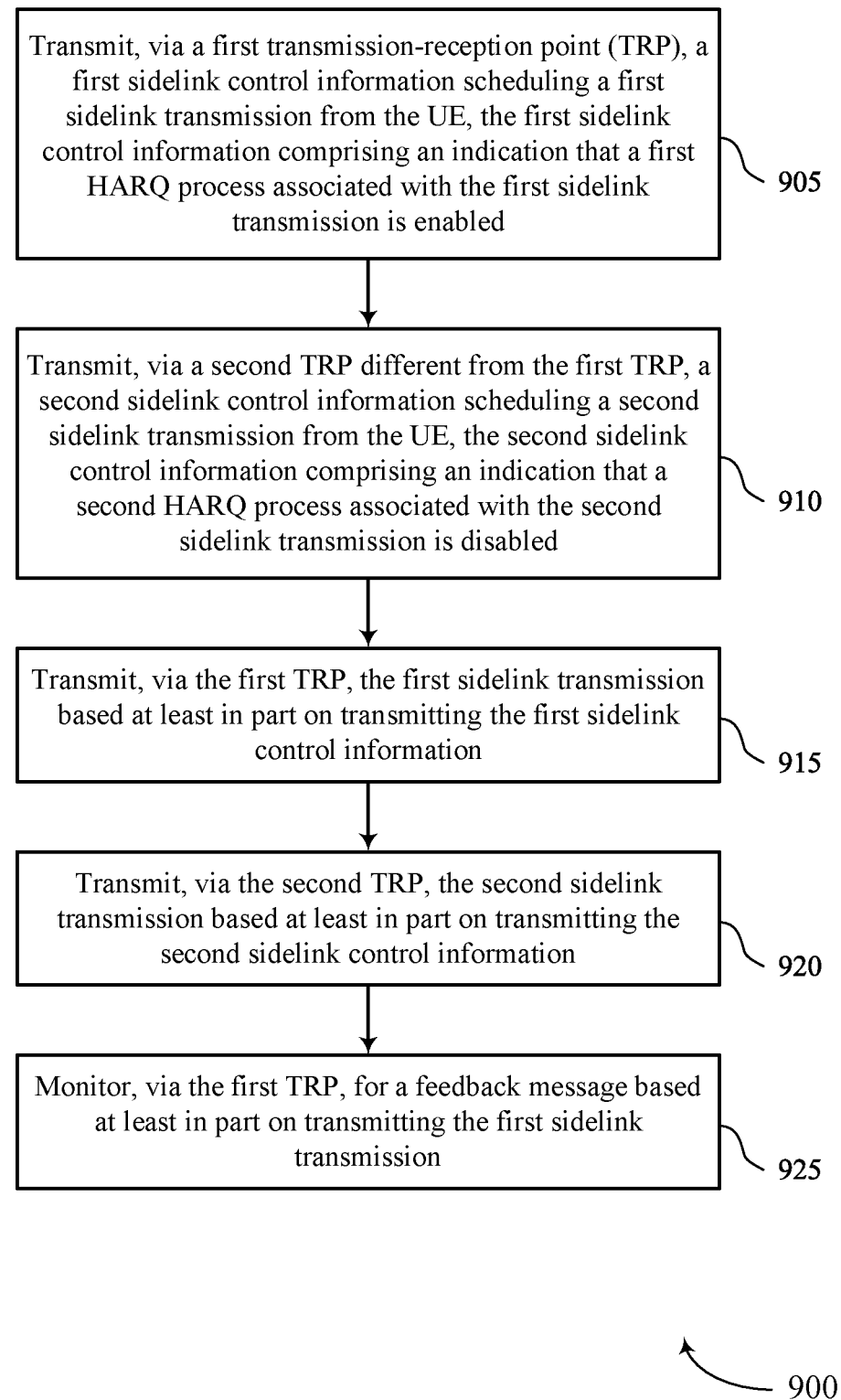
FIGS. 9 through 11 show flowcharts illustrating methods that support techniques for directional sidelink transmissions with multi-TRP UEs in accordance with aspects of the present disclosure.

FIG. 9 shows a flowchart illustrating a method 900 for techniques for directional sidelink transmissions with multi-TRP UEs in accordance with aspects of the present disclosure. The operations of method 900 may be implemented by a UE or its components as described herein. For example, the operations of method 900 may be performed by a UE 115 as described with reference to FIGS. 1 through 8. In some examples, a UE may execute a set of instructions to control the functional elements of the device to perform the described functions. Additionally or alternatively, the UE may perform aspects of the described functions using special-purpose hardware.

At 905, the method may include transmitting, via a first TRP, a first SCI scheduling a first sidelink transmission from the UE, the first SCI comprising an indication that a first hybrid automatic repeat request (HARQ) process associated with the first sidelink transmission is enabled. The operations of 905 may be performed according to the methods described herein. In some examples, aspects of the operations of 905 may be performed by a SCI transmitting manager 725 as described with reference to FIG. 7.

At 910, the method may include transmitting, via a second TRP different from the first TRP, a second SCI scheduling a second sidelink transmission from the UE, the second SCI comprising an indication that a second HARQ process associated with the second sidelink transmission is disabled. The operations of 910 may be performed according to the methods described herein. In some examples, aspects of the operations of 910 may be performed by a SCI transmitting manager 725 as described with reference to FIG. 7.

At 915, the method may include transmitting, via the first TRP, the first sidelink transmission based at least in part on transmitting the first SCI. The operations of 915 may be performed according to the methods described herein. In some examples, aspects of the operations of 915 may be performed by a sidelink transmission manager 730 as described with reference to FIG. 7.

At 920, the method may include transmitting, via the second TRP, the second sidelink transmission based at least in part on transmitting the second SCI. The operations of 920 may be performed according to the methods described herein. In some examples, aspects of the operations of 920 may be performed by a sidelink transmission manager 730 as described with reference to FIG. 7.

At 925, the method may include monitoring, via the first TRP, for a feedback message based at least in part on transmitting the first sidelink transmission. The operations of 925 may be performed according to the methods described herein. In some examples, aspects of the operations of 925 may be performed by a feedback reception manager 735 as described with reference to FIG. 7.

Figure 10:
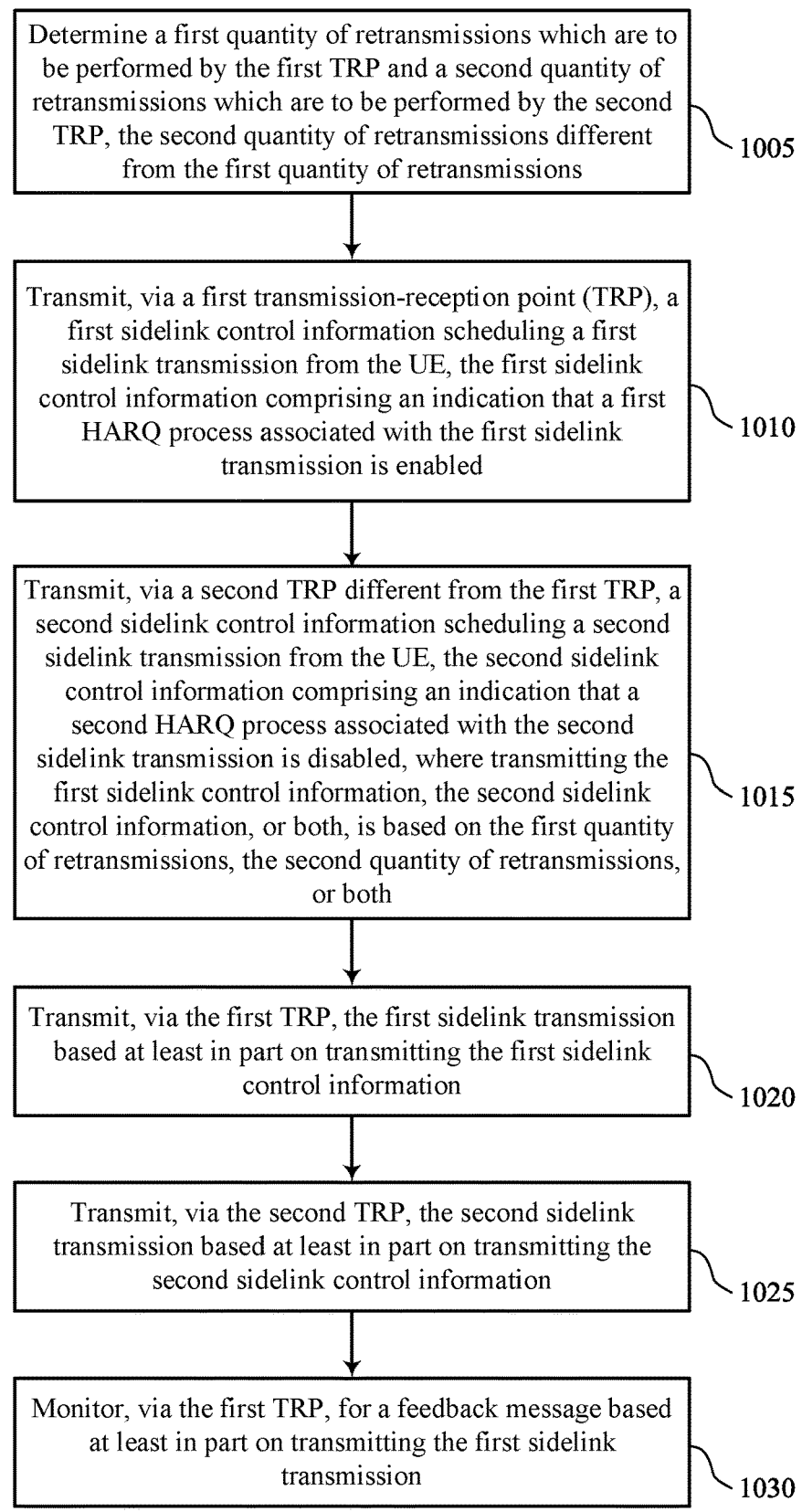

FIG. 10 shows a flowchart illustrating a method 1000 for techniques for directional sidelink transmissions with multi-TRP UEs in accordance with aspects of the present disclosure. The operations of method 1000 may be implemented by a UE or its components as described herein. For example, the operations of method 1000 may be performed by a UE 115 as described with reference to FIGS. 1 through 8. In some examples, a UE may execute a set of instructions to control the functional elements of the device to perform the described functions. Additionally or alternatively, the UE may perform aspects of the described functions using special-purpose hardware.

At 1005, the method may include determining a first quantity of retransmissions which are to be performed by the first TRP and a second quantity of retransmissions which are to be performed by the second TRP, the second quantity of retransmissions different from the first quantity of retransmissions. The operations of 1005 may be performed according to the methods described herein. In some examples, aspects of the operations of 1005 may be performed by a retransmission manager 745 as described with reference to FIG. 7.

At 1010, the method may include transmitting, via a first TRP, a first SCI scheduling a first sidelink transmission from the UE, the first SCI comprising an indication that a first hybrid automatic repeat request (HARQ) process associated with the first sidelink transmission is enabled. The operations of 1010 may be performed according to the methods described herein. In some examples, aspects of the operations of 1010 may be performed by a SCI transmitting manager 725 as described with reference to FIG. 7.

At 1015, the method may include transmitting, via a second TRP different from the first TRP, a second SCI scheduling a second sidelink transmission from the UE, the second SCI comprising an indication that a second HARQ process associated with the second sidelink transmission is disabled, where transmitting the first SCI, the second SCI, or both, is based on the first quantity of retransmissions, the second quantity of retransmissions, or both. The operations of 1015 may be performed according to the methods described herein. In some examples, aspects of the operations of 1015 may be performed by a SCI transmitting manager 725 as described with reference to FIG. 7.

At 1020, the method may include transmitting, via the first TRP, the first sidelink transmission based at least in part on transmitting the first SCI. The operations of 1020 may be performed according to the methods described herein. In some examples, aspects of the operations of 1020 may be performed by a sidelink transmission manager 730 as described with reference to FIG. 7.

At 1025, the method may include transmitting, via the second TRP, the second sidelink transmission based at least in part on transmitting the second SCI. The operations of 1025 may be performed according to the methods described herein. In some examples, aspects of the operations of 1025 may be performed by a sidelink transmission manager 730 as described with reference to FIG. 7.

At 1030, the method may include monitoring, via the first TRP, for a feedback message based at least in part on transmitting the first sidelink transmission. The operations of 1030 may be performed according to the methods described herein. In some examples, aspects of the operations of 1030 may be performed by a feedback reception manager 735 as described with reference to FIG. 7.

Figure 11:
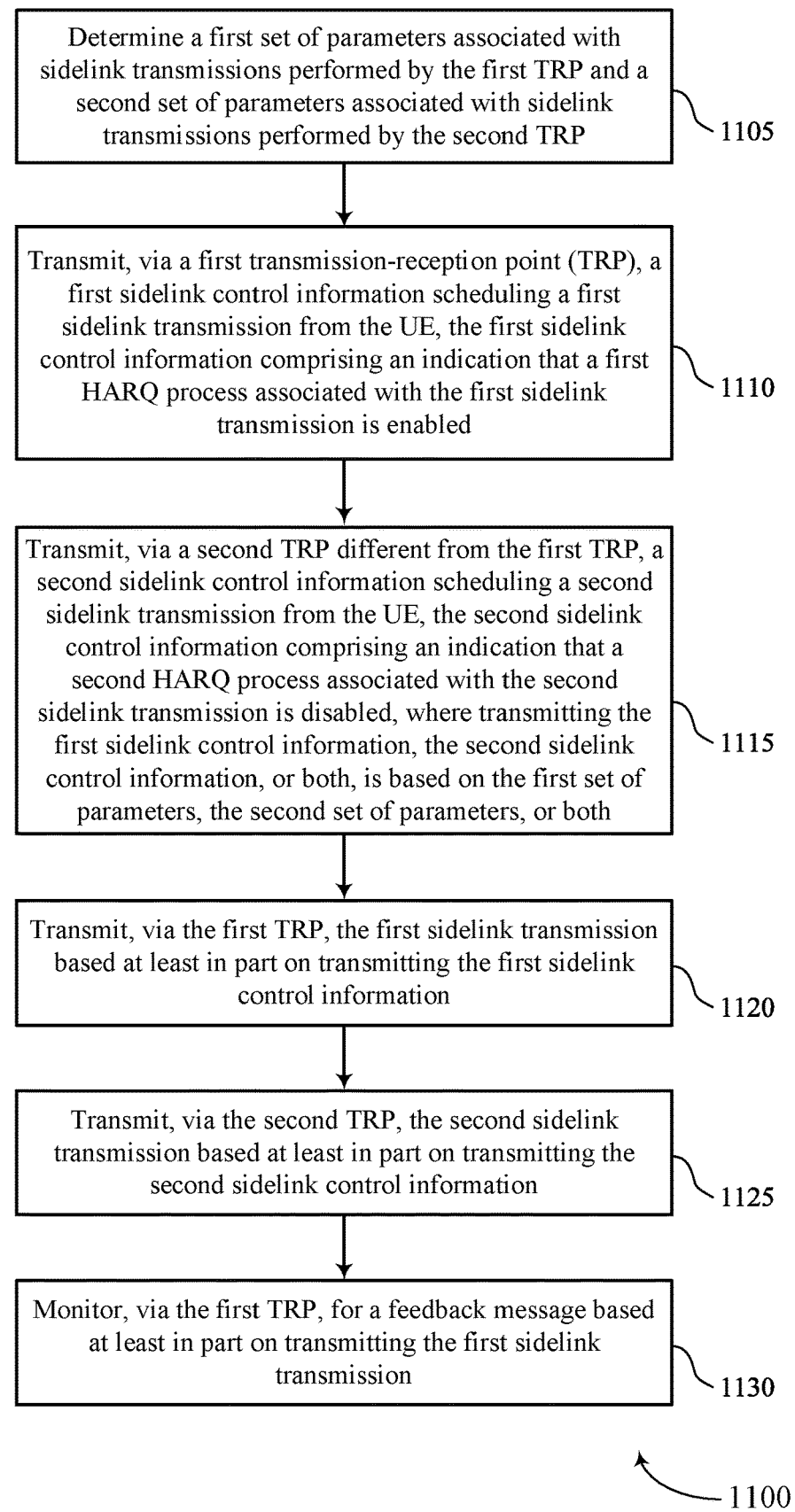

FIG. 11 shows a flowchart illustrating a method 1100 for techniques for directional sidelink transmissions with multi-TRP UEs in accordance with aspects of the present disclosure. The operations of method 1100 may be implemented by a UE or its components as described herein. For example, the operations of method 1100 may be performed by a UE 115 as described with reference to FIGS. 1 through 8. In some examples, a UE may execute a set of instructions to control the functional elements of the device to perform the described functions. Additionally or alternatively, the UE may perform aspects of the described functions using special-purpose hardware.

At 1105, the method may include determining a first set of parameters associated with sidelink transmissions performed by the first TRP and a second set of parameters associated with sidelink transmissions performed by the second TRP. The operations of 1105 may be performed according to the methods described herein. In some examples, aspects of the operations of 1105 may be performed by a sidelink parameter manager 750 as described with reference to FIG. 7.

At 1110, the method may include transmitting, via a first TRP, a first SCI scheduling a first sidelink transmission from the UE, the first SCI comprising an indication that a first hybrid automatic repeat request (HARQ) process associated with the first sidelink transmission is enabled. The operations of 1110 may be performed according to the methods described herein. In some examples, aspects of the operations of 1110 may be performed by a SCI transmitting manager 725 as described with reference to FIG. 7.

At 1115, the method may include transmitting, via a second TRP different from the first TRP, a second SCI scheduling a second sidelink transmission from the UE, the second SCI comprising an indication that a second HARQ process associated with the second sidelink transmission is disabled, where transmitting the first SCI, the second SCI, or both, is based on the first set of parameters, the second set of parameters, or both. The operations of 1115 may be performed according to the methods described herein. In some examples, aspects of the operations of 1115 may be performed by a SCI transmitting manager 725 as described with reference to FIG. 7.

At 1120, the method may include transmitting, via the first TRP, the first sidelink transmission based at least in part on transmitting the first SCI. The operations of 1120 may be performed according to the methods described herein. In some examples, aspects of the operations of 1120 may be performed by a sidelink transmission manager 730 as described with reference to FIG. 7.

At 1125, the method may include transmitting, via the second TRP, the second sidelink transmission based at least in part on transmitting the second SCI. The operations of 1125 may be performed according to the methods described herein. In some examples, aspects of the operations of 1125 may be performed by a sidelink transmission manager 730 as described with reference to FIG. 7.

At 1130, the method may include monitoring, via the first TRP, for a feedback message based at least in part on transmitting the first sidelink transmission. The operations of 1130 may be performed according to the methods described herein. In some examples, aspects of the operations of 1130 may be performed by a feedback reception manager 735 as described with reference to FIG. 7.

It should be noted that the methods described herein describe possible implementations, and that the operations and the steps may be rearranged or otherwise modified and that other implementations are possible. Further, aspects from two or more of the methods may be combined.

At 445, the first UE 115-*g* may transmit the second sidelink transmission using the second TRP. In some aspects, the first UE 115-*g* may transmit the second sidelink transmission based on the second SCI at 435. The second sidelink transmission may be transmitted to the second UE 115-*h*, the third UE 115-*i*, or both. In some aspects, the second sidelink transmission may be transmitted based on (e.g., using, according to) the second set of resources indicated in the second SCI. Additionally or alternatively, the first UE 115-*g* may transmit the second sidelink transmission at 445 based on determining the HARQ process identifier at 405, determining the sidelink transmission histories at 410, determining the QoS metrics at 415, determining the quantities of retransmissions at 420, determining the sets of parameters at 425, or any combination thereof.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   transmitting, via a first transmission-reception point (TRP), a first sidelink control information scheduling a first sidelink transmission from the UE, the first sidelink control information comprising an indication that a first hybrid automatic repeat request (HARQ) process associated with the first sidelink transmission is enabled;
   transmitting, via a second TRP different from the first TRP, a second sidelink control information scheduling a second sidelink transmission from the UE, the second sidelink control information comprising an indication that a second HARQ process associated with the second sidelink transmission is disabled;
   transmitting, via the first TRP, the first sidelink transmission based at least in part on transmitting the first sidelink control information;
   transmitting, via the second TRP, the second sidelink transmission based at least in part on transmitting the second sidelink control information; and
   monitoring, via the first TRP, for a feedback message based at least in part on transmitting the first sidelink transmission.

2. The method of claim 1, further comprising:
   transmitting, via the first sidelink control information, a first value of a first bit field associated with the first HARQ process, wherein the indication that the first HARQ process is enabled comprises the first value; and
   transmitting, via the second sidelink control information, a second value of a second bit field associated with the second HARQ process, wherein the indication that the second HARQ process is disabled comprises the second value.

3. The method of claim 1, further comprising:
   determining a HARQ process identifier associated with sidelink transmissions performed by the UE; and
   transmitting, via the first sidelink control information, the second sidelink control information, or both, an indication that the first sidelink transmission, the second sidelink transmission, or both, are associated with the determined HARQ process identifier.

4. The method of claim 1, further comprising:
   determining a first quantity of retransmissions which are to be performed by the first TRP and a second quantity of retransmissions which are to be performed by the second TRP, the second quantity of retransmissions different from the first quantity of retransmissions, wherein transmitting the first sidelink control information, the second sidelink control information, or both, is based on the first quantity of retransmissions, the second quantity of retransmissions, or both.

5. The method of claim 4, further comprising:
   retransmitting the first sidelink transmission, via the first TRP, based at least in part on the first quantity of retransmissions; and
   retransmitting the second sidelink transmission, via the second TRP, based at least in part on the second quantity of retransmissions.

6. The method of claim 4, further comprising:
   determining that the first quantity of retransmissions is greater than the second quantity of retransmissions, wherein transmitting the first sidelink control information, the second sidelink control information, or both, is based on determining that the first quantity of retransmissions is greater than the second quantity of retransmissions.

7. The method of claim 4, further comprising:
determining a first quality of service metric associated with sidelink transmissions performed by the first TRP and a second quality of service metric associated with sidelink transmissions performed by the second TRP, wherein determining the first quantity of retransmissions, the second quantity of retransmissions, or both, is based at least in part on the first quality of service metric, the second quality of service metric, or both.

8. The method of claim 4, further comprising:
determining a first sidelink transmission history associated with the first TRP and a second sidelink transmission history associated with the second TRP, wherein determining the first quantity of retransmissions, the second quantity of retransmissions, or both, is based at least in part on the first sidelink transmission history, the second sidelink transmission history, or both.

9. The method of claim 1, further comprising:
determining a first set of parameters associated with sidelink transmissions performed by the first TRP and a second set of parameters associated with sidelink transmissions performed by the second TRP, wherein transmitting the first sidelink control information, the second sidelink control information, or both, is based on the first set of parameters, the second set of parameters, or both.

10. The method of claim 9, further comprising:
receiving, from a higher layer of the UE, an indication of the first set of parameters, the second set of parameters, or both, wherein determining the first set of parameters, the second set of parameters, or both, is based at least in part on receiving the indication from the higher layer of the UE.

11. The method of claim 9, wherein the first set of parameters, the second set of parameters, or both, comprises a reliability metric, a latency metric, a HARQ process state, a transmission bias metric, a range metric, or any combination thereof.

12. The method of claim 9, further comprising:
determining a first reliability metric associated with sidelink transmissions performed by the first TRP and a second reliability metric associated with sidelink transmissions performed by the second TRP, wherein the first set of parameters comprises the first reliability metric and the second set of parameters comprises the second reliability metric; and
determining that the second reliability metric is greater than the first reliability metric, wherein transmitting the first sidelink control information, the second sidelink control information, or both, is based at least in part on determining the second reliability metric is greater than the first reliability metric.

13. The method of claim 9, further comprising:
determining a first latency metric associated with sidelink transmissions performed by the first TRP and a second latency metric associated with sidelink transmissions performed by the second TRP, wherein the first set of parameters comprises the first latency metric and the second set of parameters comprises the second latency metric; and
determining that the first latency metric is greater than the second latency metric, wherein transmitting the first sidelink control information, the second sidelink control information, or both, is based at least in part on determining the first latency metric is greater than the second latency metric.

14. The method of claim 9, further comprising:
determining a first range metric associated with sidelink transmissions performed by the first TRP and a second range metric associated with sidelink transmissions performed by the second TRP, wherein the first set of parameters comprises the first range metric and the second set of parameters comprises the second range metric;
comparing the first range metric and the second range metric, wherein transmitting the first sidelink control information, the second sidelink control information, or both, is based at least in part on a result of the comparison.

15. The method of claim 1, further comprising:
receiving, via the first TRP, the feedback message from a second UE based at least in part on the monitoring via the first TRP.

16. The method of claim 1, further comprising:
monitoring, via the second TRP, for a second feedback message based at least in part on transmitting the second sidelink transmission; and
receiving, via the second TRP, the second feedback message based at least in part on the monitoring via the second TRP.

17. An apparatus for wireless communication at a user equipment (UE), comprising:
a processor;
memory coupled with the processor; and
instructions stored in the memory and executable by the processor to cause the apparatus to:
transmit, via a first transmission-reception point (TRP), a first sidelink control information scheduling a first sidelink transmission from the UE, the first sidelink control information comprising an indication that a first hybrid automatic repeat request (HARQ) process associated with the first sidelink transmission is enabled;
transmit, via a second TRP different from the first TRP, a second sidelink control information scheduling a second sidelink transmission from the UE, the second sidelink control information comprising an indication that a second HARQ process associated with the second sidelink transmission is disabled;
transmit, via the first TRP, the first sidelink transmission based at least in part on transmitting the first sidelink control information;
transmit, via the second TRP, the second sidelink transmission based at least in part on transmitting the second sidelink control information; and
monitor, via the first TRP, for a feedback message based at least in part on transmitting the first sidelink transmission.

18. The apparatus of claim 17, wherein the instructions are further executable by the processor to cause the apparatus to:
transmit, via the first sidelink control information, a first value of a first bit field associated with the first HARQ process, wherein the indication that the first HARQ process is enabled comprises the first value; and
transmit, via the second sidelink control information, a second value of a second bit field associated with the second HARQ process, wherein the indication that the second HARQ process is disabled comprises the second value.

19. The apparatus of claim 17, wherein the instructions are further executable by the processor to cause the apparatus to:
    determine a HARQ process identifier associated with sidelink transmissions performed by the UE; and
    transmit, via the first sidelink control information, the second sidelink control information, or both, an indication that the first sidelink transmission, the second sidelink transmission, or both, are associated with the determined HARQ process identifier.

20. The apparatus of claim 17, wherein the instructions are further executable by the processor to cause the apparatus to:
    determine a first quantity of retransmissions which are to be performed by the first TRP and a second quantity of retransmissions which are to be performed by the second TRP, the second quantity of retransmissions different from the first quantity of retransmissions, wherein transmitting the first sidelink control information, the second sidelink control information, or both, is based on the first quantity of retransmissions, the second quantity of retransmissions, or both.

21. The apparatus of claim 20, wherein the instructions are further executable by the processor to cause the apparatus to:
    retransmit the first sidelink transmission, via the first TRP, based at least in part on the first quantity of retransmissions; and
    retransmit the second sidelink transmission, via the second TRP, based at least in part on the second quantity of retransmissions.

22. The apparatus of claim 20, wherein the instructions are further executable by the processor to cause the apparatus to:
    determine that the first quantity of retransmissions is greater than the second quantity of retransmissions, wherein transmitting the first sidelink control information, the second sidelink control information, or both, is based on determining that the first quantity of retransmissions is greater than the second quantity of retransmissions.

23. The apparatus of claim 20, wherein the instructions are further executable by the processor to cause the apparatus to:
    determine a first quality of service metric associated with sidelink transmissions performed by the first TRP and a second quality of service metric associated with sidelink transmissions performed by the second TRP, wherein determining the first quantity of retransmissions, the second quantity of retransmissions, or both, is based at least in part on the first quality of service metric, the second quality of service metric, or both.

24. The apparatus of claim 20, wherein the instructions are further executable by the processor to cause the apparatus to:
    determine a first sidelink transmission history associated with the first TRP and a second sidelink transmission history associated with the second TRP, wherein determining the first quantity of retransmissions, the second quantity of retransmissions, or both, is based at least in part on the first sidelink transmission history, the second sidelink transmission history, or both.

25. The apparatus of claim 17, wherein the instructions are further executable by the processor to cause the apparatus to:
    determine a first set of parameters associated with sidelink transmissions performed by the first TRP and a second set of parameters associated with sidelink transmissions performed by the second TRP, wherein transmitting the first sidelink control information, the second sidelink control information, or both, is based on the first set of parameters, the second set of parameters, or both.

26. The apparatus of claim 25, wherein the instructions are further executable by the processor to cause the apparatus to:
    receive, from a higher layer of the UE, an indication of the first set of parameters, the second set of parameters, or both, wherein determining the first set of parameters, the second set of parameters, or both, is based at least in part on receiving the indication from the higher layer of the UE.

27. The apparatus of claim 25, wherein the first set of parameters, the second set of parameters, or both, comprises a reliability metric, a latency metric, a HARQ process state, a transmission bias metric, a range metric, or any combination thereof.

28. The apparatus of claim 25, wherein the instructions are further executable by the processor to cause the apparatus to:
    determine a first reliability metric associated with sidelink transmissions performed by the first TRP and a second reliability metric associated with sidelink transmissions performed by the second TRP, wherein the first set of parameters comprises the first reliability metric and the second set of parameters comprises the second reliability metric; and
    determine that the second reliability metric is greater than the first reliability metric, wherein transmitting the first sidelink control information, the second sidelink control information, or both, is based at least in part on determining the second reliability metric is greater than the first reliability metric.

29. The apparatus of claim 25, wherein the instructions are further executable by the processor to cause the apparatus to:
    determine a first latency metric associated with sidelink transmissions performed by the first TRP and a second latency metric associated with sidelink transmissions performed by the second TRP, wherein the first set of parameters comprises the first latency metric and the second set of parameters comprises the second latency metric; and
    determine that the first latency metric is greater than the second latency metric, wherein transmitting the first sidelink control information, the second sidelink control information, or both, is based at least in part on determining the first latency metric is greater than the second latency metric.

30. The apparatus of claim 25, wherein the instructions are further executable by the processor to cause the apparatus to:
    determine a first range metric associated with sidelink transmissions performed by the first TRP and a second range metric associated with sidelink transmissions performed by the second TRP, wherein the first set of parameters comprises the first range metric and the second set of parameters comprises the second range metric;
    compare the first range metric and the second range metric, wherein transmitting the first sidelink control information, the second sidelink control information, or both, is based at least in part on a result of the comparison.

31. The apparatus of claim 17, wherein the instructions are further executable by the processor to cause the apparatus to:
  receive, via the first TRP, the feedback message from a second UE based at least in part on the monitoring via the first TRP.

32. The apparatus of claim 17, wherein the instructions are further executable by the processor to cause the apparatus to:
  monitor, via the second TRP, for a second feedback message based at least in part on transmitting the second sidelink transmission; and
  receive, via the second TRP, the second feedback message based at least in part on the monitoring via the second TRP.

33. An apparatus for wireless communication at a user equipment (UE), comprising:
  means for transmitting, via a first transmission-reception point (TRP), a first sidelink control information scheduling a first sidelink transmission from the UE, the first sidelink control information comprising an indication that a first hybrid automatic repeat request (HARQ) process associated with the first sidelink transmission is enabled;
  means for transmitting, via a second TRP different from the first TRP, a second sidelink control information scheduling a second sidelink transmission from the UE, the second sidelink control information comprising an indication that a second HARQ process associated with the second sidelink transmission is disabled;
  means for transmitting, via the first TRP, the first sidelink transmission based at least in part on transmitting the first sidelink control information;
  means for transmitting, via the second TRP, the second sidelink transmission based at least in part on transmitting the second sidelink control information; and
  means for monitoring, via the first TRP, for a feedback message based at least in part on transmitting the first sidelink transmission.

34. A non-transitory computer-readable medium storing code for wireless communication at a user equipment (UE), the code comprising instructions executable by a processor to:
  transmit, via a first transmission-reception point (TRP), a first sidelink control information scheduling a first sidelink transmission from the UE, the first sidelink control information comprising an indication that a first hybrid automatic repeat request (HARQ) process associated with the first sidelink transmission is enabled;
  transmit, via a second TRP different from the first TRP, a second sidelink control information scheduling a second sidelink transmission from the UE, the second sidelink control information comprising an indication that a second HARQ process associated with the second sidelink transmission is disabled;
  transmit, via the first TRP, the first sidelink transmission based at least in part on transmitting the first sidelink control information;
  transmit, via the second TRP, the second sidelink transmission based at least in part on transmitting the second sidelink control information; and
  monitor, via the first TRP, for a feedback message based at least in part on transmitting the first sidelink transmission.

* * * * *